United States Patent
Hemmer et al.

(10) Patent No.: US 11,568,575 B2
(45) Date of Patent: Jan. 31, 2023

(54) COST-DRIVEN FRAMEWORK FOR PROGRESSIVE COMPRESSION OF TEXTURED MESHES

(71) Applicant: Google LLC, Mountain View, CA (US)

(72) Inventors: Michael Hemmer, San Francisco, CA (US); Pierre Alliez, Sophia Antipolis (FR); Cedric Portaneri, Sophia Antipolis (FR)

(73) Assignee: Google LLC, Mountain View, CA (US)

( * ) Notice: Subject to any disclaimer, the term of this patent is extended or adjusted under 35 U.S.C. 154(b) by 821 days.

(21) Appl. No.: 16/411,919

(22) Filed: May 14, 2019

(65) Prior Publication Data
US 2020/0265611 A1    Aug. 20, 2020

Related U.S. Application Data

(63) Continuation-in-part of application No. 16/279,319, filed on Feb. 19, 2019, now Pat. No. 10,977,773.

(51) Int. Cl.
| | | |
|---|---|---|
| G06T 17/20 | (2006.01) | |
| G06T 9/20  | (2006.01) | |
| G06T 15/04 | (2011.01) | |
| G06T 3/40  | (2006.01) | |
| G06T 9/00  | (2006.01) | |

(52) U.S. Cl.
CPC .............. *G06T 9/20* (2013.01); *G06T 3/40* (2013.01); *G06T 9/00* (2013.01); *G06T 9/001* (2013.01); *G06T 15/04* (2013.01); *G06T 17/205* (2013.01); *G06T 17/20* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,031,548 A   * | 2/2000 | Gueziec ............... G06T 17/20 345/440 |
| 6,262,737 B1   | 7/2001 | Li et al. | |
| 6,879,324 B1   | 4/2005 | Hoppe et al. | |
| 6,995,761 B1   | 2/2006 | Schroeder et al. | |
| 10,657,675 B2  | 5/2020 | Hemmer et al. | |
| 10,987,579 B1 * | 4/2021 | Borovikov ............. A63F 13/52 |
| 2006/0181536 A1 | 8/2006 | Ostermann et al. | |
| 2012/0188241 A1 * | 7/2012 | Ahn ..................... G06T 17/20 345/420 |

(Continued)

FOREIGN PATENT DOCUMENTS

WO    WO-2013029232 A1 *  3/2013   ............. G06T 15/04

OTHER PUBLICATIONS

"Draco 3D Graphics Compression", Draco 2018, retrieved on Apr. 8, 2018 from https://google.github.io/draco/, 3 pages.

(Continued)

*Primary Examiner* — Andrew G Yang
(74) *Attorney, Agent, or Firm* — Brake Hughes Bellermann LLP

(57) ABSTRACT

Techniques of compressing level of detail (LOD) data involve sharing a texture image LOD among different mesh LODs for single-rate encoding. That is, a first texture image LOD corresponding to a first mesh LOD may be derived by refining a second texture image LOD corresponding to a second mesh LOD. This sharing is possible when texture atlases of LOD meshes are compatible.

20 Claims, 20 Drawing Sheets

(56) References Cited

U.S. PATENT DOCUMENTS

| | | | | |
|---|---|---|---|---|
| 2012/0262444 | A1* | 10/2012 | Stefanoski | G06T 9/001 345/419 |
| 2013/0114910 | A1* | 5/2013 | Mammou | G06T 9/004 382/233 |
| 2015/0170398 | A1* | 6/2015 | Hsu | G06T 15/04 345/420 |
| 2019/0318507 | A1 | 10/2019 | Hemmer et al. | |
| 2019/0318508 | A1 | 10/2019 | Hemmer et al. | |
| 2019/0320183 | A1 | 10/2019 | Hemmer et al. | |
| 2020/0265552 | A1 | 8/2020 | Hemmer et al. | |
| 2020/0265611 | A1 | 8/2020 | Hemmer et al. | |
| 2020/0320744 | A1* | 10/2020 | Nakagami | G06T 17/10 |
| 2020/0380775 | A1* | 12/2020 | Araki | H04N 19/597 |

OTHER PUBLICATIONS

"Libjpeg library", PJPEG 2018, retrieved on Nov. 11, 2018 from http://libjpeg.sourceforge.net/,1 page.

Alliez, et al., "Progressive Compression for Lossless Transmission of Triangle Meshes", Proceedings of the 28th Annual Conference on Computer Graphics and Interactive Techniques (Siggraph '01), 2001, pp. 195-202.

Caillaud, et al., "Progressive Compression of Arbitrary Textured Meshes", Computer Graphics Forum (Proceedings of Pacific Graphics), vol. 35, No. 7, 2016, 10 pages.

Deering, "Geometry Compression", Proceedings of the Annual Conference on Computer Graphics and Interactive Techniques (Siggraph '95), 1995, pp. 13-20.

Garland, et al., "Surface Simplification Using Quadric Error Metrics", Proceedings of the 24th Annual Conference on computer Graphics and Interactive Techniques (Siggraph '97), 1997, pp. 209-216.

Guo, et al., "Subjective and Objective Visual Quality Assessment of Textured 3D Meshes", vol. 14, Issue 2, Article 11, Oct. 2016, 20 pages.

Hoppe, "New Quadric Metric for Simplifying Meshes with Appearance Attributes", Proceedings of the 10th IEEE Visualization Conference (VIS '99), Oct. 1999, pp. 59-66.

Hoppe, "Progressives Meshes", Proceedings of the 23rd Annual Conference on Computer Graphics and Interactive Techniques (Siggraph '96), 1996, pp. 99-108.

Lavoue, et al., "Progressive Streaming of Textured 3D Models in a Web Browser", Proceedings of the 20th ACM Siggraph Symposium on Interactive 3D Graphics and Games (I3D '16), 2016, p. 203.

Lee, et al., "Adaptive Coarse-to-Fine Quantization for Optimizing Rate-distortion of Progressive Mesh Compression", Proceedings of Vision, Modeling, and Visualization, 2009, pp. 73-82.

Lee, et al., "Rate-distortion optimization for progressive compression of 3D mesh with color attributes", The Visual Computer, vol. 28, Issue 2, Feb. 2012, pp. 137-153.

Maglo, et al., "3D Mesh Compression: Survey, Comparisons, and Emerging Trends", ACM Computing Surveys, vol. 17, No. 3, Article 44, Feb. 17, 2015, 41 pages.

Dajarola, et al., "Compressed Progressive Meshes", IEEE Transactions on Visualization and Computer Graphics, vol. 6, No. 1, Jan. 2000, pp. 79-93.

Peng, et al., "Geometry-guided Progressive Lossless 3D Mesh Coding with Octree (OT) Decomposition", Siggraph '05, 2005, 8 pages.

Rossignac, "Edgebreaker: Connectivity Compression for Triangle Meshes", IEEE Transactions on Visualization and Computer Graphics, vol. 5, No. 1, Jan. 1999, pp. 47-61.

Sander, et al., "Texture Mapping Progressive Meshes", Proceedings of the 28th Annual Conference on Computer Graphics and Interactive Techniques (Siggraph '01), 2001, pp. 409-416.

Tian, et al., "BaTex3: Bit Allocation for Progressive Transmission of Textured 3-D Models", IEEE Transactions on Circuits and Systems for Video Technology, vol. 18, No. 1, 2008, pp. 23-35.

Touma, et al., "Triangle Mesh Compression", Proceedings of the Graphics Interface Conference, 1998, pp. 26-34.

Wallace, "The JPEG still picture compression standard", Communications of the ACM, vol. 34, No. 4, Apr. 1991, pp. 30-44.

Wang, et al., "Multiscale structural similarity for image quality assessment", Proceedings of the 37th IEEE Asilomar Conference Signals, Systems and Computers, Nov. 2003, 5 pages.

Yang, et al., "Optimized Mesh and Texture Multiplexing for Progressive Textured Model Transmission", Proceedings of the ACM International Conference on Multimedia (Multimedia), 2004, pp. 676-683.

Karni, et al., "Spectral Compression of Mesh Geometry", Siggraph'00, 2000, pp. 279-286.

Mamou, et al., "Shape Approximation for Efficient Progressive Mesh Compression", Proceedings of 2010 IEEE 17th International Conference on Image Processing, Sep. 26-29, 2010, pp. 3425-3428.

Portaneri, et al., "Cost-driven framework for progressive compression of textured meshes", Proceedings of the 10th ACM Multimedia Systems Conference, XP055657913, Jun. 18, 2019, pp. 175-188.

* cited by examiner

| Models | # Vertices | Without Texture Cost | | | With Texture Cost | | |
|---|---|---|---|---|---|---|---|
| | | CVDL16 | OPT(SG) | PG | OPT(SGT) | OPT(SG)+PT | PG+PT |
| Aix | 686,061 | 0.257466 | 0.298142 | 0.227286 | 0.541693 | 0.432085 | 0.358942 |
| Ajaccio | 617,257 | 0.265585 | 0.173482 | 0.166666 | 0.296426 | 0.288352 | 0.283547 |
| Barabas | 36,741 | 0.646291 | 0.654915 | 0.527746 | 6.831700 | 5.554740 | 5.178070 |
| Bird | 12,432 | 0.925169 | 0.624688 | 0.568855 | 2.827090 | 1.752870 | 1.723806 |
| Dwarf | 1,288,973 | 0.066505 | 0.062620 | 0.053197 | 0.299184 | 0.264752 | 0.259349 |
| Massai Man | 99,564 | 0.565755 | 0.452293 | 0.441271 | 1.548940 | 1.276600 | 1.269712 |
| Massai Woman | 112,513 | 0.479838 | 0.469566 | 0.422668 | 1.692860 | 1.305260 | 1.223950 |
| Taichi | 50,000 | 1.158152 | 0.706814 | 0.629271 | 3.933750 | 2.014700 | 1.929665 |
| Tiger | 314,218 | 0.196941 | 0.159542 | 0.133725 | 0.632629 | 0.486700 | 0.461431 |
| Salamander | 35,289 | 0.779823 | 0.643655 | 0.553208 | 4.670200 | 3.933090 | 3.795793 |

FIG. 11A

COST-DRIVEN FRAMEWORK FOR PROGRESSIVE COMPRESSION OF TEXTURED MESHES

CROSS-REFERENCE TO RELATED APPLICATIONS

This application is a continuation-in-part of U.S. patent application Ser. No. 16/279,319, filed on Feb. 19, 2019, entitled "Cost-Driven Framework for Progressive Compression of Textured Meshes," the disclosure of which is incorporated by reference herein in its entirety.

TECHNICAL FIELD

This description relates to compression of three-dimensional object data.

BACKGROUND

Some applications such as video games in virtual reality (VR), office applications in augmented reality (AR), and mapping software applications involve representing three-dimensional objects to a user. In one example, an adventure game played by a user in a virtual reality environment may require the generation of virtual trees, rocks, and people. In another example, a mapping application may require the representation of buildings. In some applications, each such object includes a triangular mesh having a plurality of vertices, i.e., points in space that form triangles. Such a triangular mesh involves a plethora of data that may be stored on disk and transmitted to the user. Practical implementations of storing and transmitting the triangular mesh data representing a virtual object include compressing the triangular mesh data. Some applications such as video games in virtual reality (VR), office applications in augmented reality (AR), and mapping software applications involve representing three-dimensional objects to a user. In one example, an adventure game played by a user in a virtual reality environment may provide representations of virtual trees, rocks, buildings or people. In some applications, it is beneficial to provide for an object several approximations of varying level of detail. A low level of detail (requiring less data) may be used as a placeholder while the actual object is still loading to improve the experience of the user. In some applications, a lower level is displayed while the object is in the distance, and a higher level is needed, e.g., as the distance between the user and the object decreased.

In some applications, data representing these objects include a triangular mesh having a plurality of vertices, i.e., points in space that form triangles, and potentially other attributes such as normals, color or UV coordinates associated with corresponding texture images. (UV coordinates are a two-dimensional representation of texture data that is rendered in three dimensions.) In the process, a plethora of data may be stored on disk or transmitted to the user. A progressive encoding of the data is the encoding of a chain of LODs where the encoder provides for a LOD in the chain a data structure that allows the generation of the LOD from a previous LOD in the chain. Thereby, compression can benefit from information in the previous LOD.

SUMMARY

In one general aspect, a method can include obtaining, by processing circuitry of a server computer configured to encode information related to a surface of a three-dimensional object, data representing an initial level of detail (LOD), the initial LOD including an initial mesh LOD and an initial texture image LOD, the initial mesh LOD including an initial triangular mesh and an initial texture atlas. The method can also include generating, by the processing circuitry, a plurality of LODs based on the initial LOD, each of the LODs of the plurality including a respective mesh LOD and a respective texture image LOD, a first texture image LOD of a first LOD of the plurality being a refinement of a second texture image LOD of a second LOD of the plurality. The method can further include performing, by the processing circuitry, single-rate encoding operations on the respective mesh LODs of a sequence of LODs of the plurality to produce a sequence of single-rate encoded mesh LODs, the single-rate encoded mesh LODs, when combined with an encoding of corresponding texture image LODs, forming an efficient compression of the data that, upon decoding, enables a user to render the surface at any LOD.

The details of one or more implementations are set forth in the accompanying drawings and the description below. Other features will be apparent from the description and drawings, and from the claims.

BRIEF DESCRIPTION OF THE DRAWINGS

FIG. 11A is a diagram illustrating a table comparing values of agony from different approaches to compressing various models.

DETAILED DESCRIPTION

Figure 1:
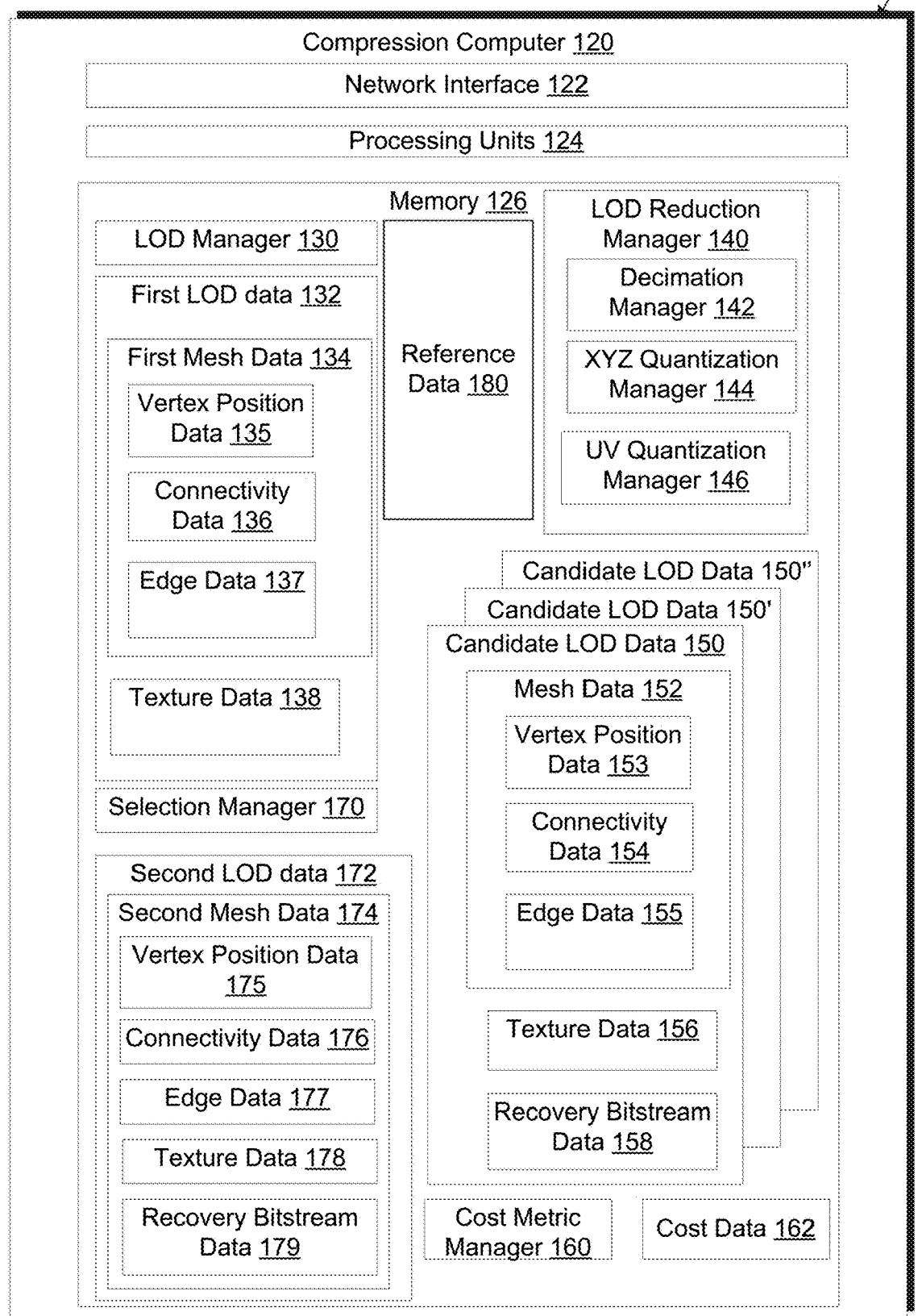
FIG. 1 is a diagram that illustrates an example electronic environment for implementing improved techniques described herein.

A conventional approach to compression of triangular mesh data involves encoding a level of detail (LOD) refinement in a progressive encoder. In this progressive encoder, the refinement is represented by a bitstream produced by the encoder. Such a conventional progressive encoder uses the same algorithm to reduce a LOD at each LOD reduction step. Accordingly, the encoding process begins with a high LOD, including a very fine mesh, from which successively lower LODs, including lower meshes, are all generated using, for example, a specific mesh decimation algorithm to produce a chain of LODs of the encoded progressive mesh.

A technical problem involved in the above-described conventional approach to compressing triangular mesh data is that the above-described conventional approach to compressing triangular mesh data lacks flexibility and may result in a suboptimal decoding experience for a user. For example, a progressive mesh encoder may use the mesh decimation process to define a lower level of detail (LOD) to be used by a progressive mesh decoder, in which a lower LOD corresponds to a less faithful representation of a surface of a three-dimensional object. Nevertheless, there are other LOD reduction processes, e.g., quantization, by which a lower LOD may be defined by an encoder for a decoder. It is unclear which of the different processes may result in a better experience for the user in terms of distortion that the user experiences while the chain of LODs is being transferred and displayed.

A technical solution to the above-described technical problem involves defining a cost metric that predicts how much computing resources are necessary to decode and render a mesh at a given LOD. The cost metric may be optimized by a selection of a LOD reduction process of a plurality of processes at each LOD reduction step. For each process of the plurality of processes, the LOD is reduced according to that process and the resulting reduced LOD is evaluated according to the cost metric. Each such process at that LOD reduction step produces a respective LOD, which includes a mesh, zero or more texture atlases, and/or other attributes. The LOD produced by the process having the lowest value of the cost metric at a reduction step is the LOD that is input into the next LOD reduction step. As an example, three LOD reduction processes include decimation, quantization of vertex coordinates (i.e., "XYZ coordinates"), and quantization of texture coordinates (i.e., "UV coordinates").

A technical advantage of the above-described technical solution is that a progressive mesh encoder resulting from such an optimization of the agony at each LOD reduction phase will improve the rate-distortion tradeoff and, ultimately, the user's experience in decoding and rendering the LODs representing three-dimensional objects in an application.

As stated above, a LOD as defined herein is a representation of a surface that includes a mesh (e.g., a triangular mesh including connectivity data), one or more texture atlases (i.e., a section of a plane that include texture patches, each of which is mapped onto clusters of faces of the mesh), as well as potentially other attributes (e.g., vertex coordinates, normal, colors). LODs rather than meshes are operated on herein so that cost metrics may be dependent on all data used to describe the object represented by the LOD rather than the mesh only, for instance, the LOD may also be reduced by reducing the quality of the used texture image.

As also stated above, a lower LOD corresponds to a less faithful representation of a surface of a three-dimensional object. Because a representation of a surface includes not only a geometrical mesh but also a texture and attributes, an ordering of the LODs may refer not only to a number of vertices of the mesh, but also a number of pixels of a texture atlas representing a texture of the surface. For example, a first LOD may be higher (or lower) than a second LOD even though their respective meshes have the same number of vertices because the first mesh may have more (or fewer) pixels in their respective texture atlases.

FIG. 1 is a diagram that illustrates an example electronic environment 100 in which the above-described technical solution may be implemented. As shown, in FIG. 1, the example electronic environment 100 includes a compression computer 120.

The compression computer 120 is configured to compress data associated with a triangular mesh representing a three-dimensional object. The compression computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the compression computer 120 can be, or can include processors (e.g., processing units 124) configured to process instructions stored in the memory 126. Examples of such instructions as depicted in FIG. 1 include a LOD manager 130, a LOD reduction manager 140, a cost metric manager 160, and a selection manager 170. Further, as illustrated in FIG. 1, the memory 126 is configured to store various data, which is described with respect to the respective managers that use such data.

The LOD manager 130 is configured to obtain, store, and/or transmit first LOD data 132. In some implementations, the LOD manager 130 is configured to receive the first LOD data 132 over a network connection via the network interface 122. In some implementations, the LOD manager 130 is configured to produce the first LOD data 132. In some implementations, the mesh manager 130 is configured to retrieve the first LOD data 132 from a storage medium (e.g., a disk, a flash drive, or the like).

The first LOD data 132 represents a LOD that is input into the LOD reduction manager 140. The LOD itself represents an approximation to a surface of a three-dimensional object. Such an approximation includes a geometric aspect (e.g., mesh connectivity, vertex coordinates), a texture aspect (texture atlas and coordinates), and an attribute aspect (e.g., normal, color). As shown in FIG. 1, the LOD data 132 includes first mesh data 134 and texture data 138.

The first mesh data 132 represents the triangular mesh that defines the geometry of the approximation to the surface. The mesh includes vertices, edges connecting the vertices, and triangular faces defined by the edges. As shown in FIG. 1, the first mesh data 134 includes vertex position data 135, connectivity data 136, and edge data 137.

The vertex position data 135 represents the positions of the vertices of the mesh. The positions of the vertices are representations of triplets of real numbers, each triplet being position coordinates of a vertex in space. In some implementations, the position coordinates are quantized so that the real numbers have truncated bit representations. In such an implementation, the vertices are adjusted to lie on a lattice, in which the lattice spacing decreases with the number of bits in the bit representation.

The connectivity data 136 represents the topology and adjacency of the mesh. For example, the connectivity data 136 is used to define a traversal of the mesh. In some implementations, the connectivity data 136 includes triplets of integer indices for each corner of each triangular face of the mesh, each of the triplets including an index identifier of an associated vertex, an index identifier of an opposite corner, and an index identifier of an adjacent corner. The triplets are arranged in an order for traversal of the mesh. Such triplets then provide an ordering of the triangular faces for traversal and an orientation of each triangular face. The positions of the vertices represented by the vertex position data 135 are arranged in an order defined by the index identifiers included in the connectivity data 136. In some implementations, the connectivity data 136 takes the form of a doubly connected edge list, in which an opposing corner is interpreted as a half-edge.

The edge data 137 represents the edges of the mesh as defined by the vertex position data 135. In some implementations, the edges of the mesh are indexed based on the order of the triplets defined by the vertex position data 135.

In some implementations, the texture data 138, if present, represents a texture that may be mapped onto the mesh represented by the first mesh data 134. In some implementations, the texture data 138 includes coordinate pairs within a square or rectangular boundary of a texture atlas. In some implementations, there is more than one texture atlas represented by the texture data 138. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture data 138 further represents patches of image data such that the data of a patch is mapped to a subset of the triangular faces of the mesh. In some implementations, the texture data 138 also includes seams of the texture atlas, or boundaries of each of the patches. The seams form a subset of the edges represented by the edge data 137.

The LOD reduction manager 140 is configured to perform one of a plurality of LOD reduction processes on the first LOD data 132 to produce the candidate LOD data 150, 150', and 150". As shown in FIG. 1, the LOD reduction manager 140 includes a mesh decimation manager 142, a XYZ quantization manager 144, and a UV quantization manager 146. The LOD reduction manager 140 is also configured to generate a recovery bitstream representing the LOD reduction process that had been performed to produce candidate LOD data 150, 150', 150".

In some implementations, there are one or more instances of the mesh decimation manager 142, each being configured to perform a different mesh decimation operation. In some implementations, the decimation operation may include one of a set of edge collapse operations, such as half-edge, mid-edge or a full edge operations. The full-edge collapse operation allowing to place a merged vertex freely. In some implementations, the full-edge collapse operation is configured such that the merged vertex is placed such that an error function (e.g., a quadric error metric or its variants) is minimized. In some implementations, the above-described decimation operations may include a vertex removal operation.

The mesh decimation manager 142 is configured to perform edge collapse operations on the first mesh data 134 to produce mesh data 152 of candidate LOD data 150. In some implementations, the edge collapse operations include a full edge collapse operation and a half-edge collapse operation. The half-edge collapse and the full-edge collapse are discussed in further detail with regard to FIG. 7.

In some implementations, the edge collapse operations performed on the first LOD data 132 are configured to preserve a set of seam edges. In some implementations, the seam edges may be provided alongside with the first LOD. In some implementations, the seam edges may be generated from an abstraction of the reference mesh that is provided alongside with the first LOD.

In some implementations, the abstraction may be generated by a separate dedicated process. For instance, in a process that tries to minimize the distortion of the abstraction relative to the provided reference more globally, for instance, for a fixed triangle budget (e.g., a fixed number of triangles), the process may also pay attention to specific properties of the input mesh such as symmetry. In some implementations, the abstraction is provided by an artist to minimize the perceived distortion of a human model by the abstraction.

In some implementations, the abstraction is represented by a set of edges that bound a set of polygonal faces, each being bounded by at least three edges of the set of edges. In some implementations, every polygonal face of the abstraction is bounded by exactly three edges, the abstraction is represented by a triangular mesh.

In some implementations, the set of edges of the triangular mesh of the first LOD include a possibly empty set of boundary edges. The set of seam edges includes the set of boundary edges.

A subdivision is a decomposition of a first set into a second set of subsets such that the intersection of each pair of subsets is empty and such that the union of all subsets equals the first set. Thus, each element of the first set belongs exactly to one subset of the second set. An example of the first set may be a set of all triangles of an input mesh; the subdivision is a set of patches (not necessarily triangular) embedded in a texture image.

A first set and a second set form a one-to-one correspondence if there exists a bijective function from the first set into the second set. That is each element of each set is associated with exactly one element of the other set. Thereby, the first set, or the second set or both may be a set of subsets. Specifically, a set maybe a set of subsets of a subdivision.

The set of seam edges defines a subdivision of the set of triangles of the mesh of the first LOD into a set of connected components. In some implementations, the set of connected components forms a one to one correspondence with the set of polygonal faces of the abstraction.

In some implementations, the set of seam edges is subdivided into chains of edges. The chains are a set of subsets of the set of edges forming a subdivision of the seam edges. The set of subsets form a one to one correspondence with the set of edges of the abstraction.

In some implementations, the set of seam edges may be generated by finding for every vertex of the abstraction a closest vertex on the first LOD. And then finding a disjoint set of chains of edges that connect the found vertices according to the vertex pairs defined by the edges of the abstraction. For instance, one may choose a chain of edges that is closest to the corresponding edges of the abstraction.

In some implementations, a LOD reduction process produces an edge collapse from a predefined set of allowed edge collapses. In some implementations, the LOD reduction process may include an edge collapse into the set of allowed edge collapses if the edge collapse does not move a vertex on a seam.

In some implementations, the LOD reduction process in addition produces an edge collapse into the set of allowed edge collapses if the edge is interior to the chain of edges. An edge is interior to a chain if the edge is not one of the two end edges.

Intuitively, such a seam preserving configuration guides the above-described edge collapse process towards the abstraction since a seam is protected from large distortion by never moving a vertex away from a seam chain. Specifically, this means that a vertex that belongs to more than one chain of edges does not move during any edge collapse.

In some implementations, the texture data, if present, may be reconfigured such that a chain of edges is mapped onto a straight edge in the two-dimensional set of UV coordinates. The straight edge is for example a corresponding edge of a texture atlas generated for the abstraction. The remaining UV coordinates of each polygonal patch may then be embedded inside a polygon which is the corresponding polygon in the texture atlas of the abstraction such that the embedding of UV coordinates is planar. The texture image information is moved accordingly.

If the first LOD and the second LOD are generated by seam preserving edge collapses, the image of the texture atlas of the first LOD can be shared with the resulting texture atlas of the second LOD.

The XYZ quantization manager 144 is configured to perform an XYZ quantization operation on the vertex position data 135 to produce the candidate data 150'. In some implementations, the XYZ quantization operation includes decrementing the length of a bit string representing each of the coordinate triplets represented by the vertex position data 135 by one bit. In such implementations, a vertex of the mesh is located at a center of a three-dimensional cell of a lattice. The XYZ quantization operation is configured to move the vertex to the center of a three-dimensional cell of a new lattice that has a larger spacing than the previous lattice.

The UV quantization manager 146 is configured to perform a UV quantization operation on the texture data 138, specifically a UV quantization operation on UV coordinate pairs represented by the texture data 138, to produce the candidate data 150". Similar to the XYZ quantization operation, the UV quantization operation is a reduction in which the length of a bit string representing an approximation to the real numbers of the UV coordinates is decremented by a bit. The UV coordinate of the texture atlas is at the center of a cell of a two-dimensional lattice of UV coordinates. The UV quantization manager then moves the coordinate to the center of a cell of a new lattice that has a larger spacing than the previous lattice.

The candidate LOD data 150, 150', 150" represent the output of the above-described LOD reduction operations by the LOD reduction manager 140. Similar to the first LOD data, the candidate LOD data 150 includes respective mesh data 152 and texture data 156, where the mesh data 152 includes vertex position data 153, connectivity data 154, and edge data 155. In addition, the candidate LOD data 150 includes recovery bitstream data 158. The candidate LOD data 150' and 150" include similar data as the candidate LOD data 150.

The recovery bitstream data 158 represents a recording of the LOD reduction operation—in this case, the decimation operation—by which the previous LOD may be recovered. The recovery bitstream data 158 is used by a decoder to generate the next higher LOD using the inverse of the LOD reduction operation, in this case the inverse of the mesh decimation operation performed by the mesh decimation manager 142. Further details of the recovery bitstream data 158 is described with regard to FIG. 3.

It is noted that the each of the candidate LOD data 150, 150', 150" represents an LOD that is lower than the first LOD represented by the first LOD data 132; that is, the each of the candidate data 150, 150', 150" has less data and uses fewer computational resources to decode and render than the first LOD data 132. In some implementations, the LOD reduction manager 140 also produces a very low LOD known as an abstraction LOD. The abstraction LOD is used to help define the seams that are to be preserved upon performance of a LOD reduction operation. The abstraction LOD is further discussed with regard to FIGS. 3 and 4.

The cost metric manager 160 is configured to generate cost data 162 for each of the candidate LOD data 150, 150', 150". In some implementations, the cost metric manager 160 applies a cost metric ("agony") to each of the candidate LOD data 150, 150', 150". In this implementation, the agony can be defined as a product of a measure of distortion corresponding to a candidate LOD (e.g., candidate LOD 150) and the amount of information defining each LOD. In some implementations, the amount of information is a bit rate. In some implementations, the amount of information defining each LOD includes a size of the recovery bitstream associated with that candidate LOD (e.g., recovery bitstream 158). In some implementations, the amount of information defining each LOD is size of the recovery bitstream associated with that candidate LOD. The cost data 162 then includes values of the cost metric generated by the cost metric manager 160.

The selection manager 170 is configured to perform a selection operation on the cost data 162 to produce second LOD data 172. In some implementations, the selection operation includes selecting the smallest value of the agony from the cost data. The second LOD data 172 then represents the LOD associated with that smallest value of the agony.

The second LOD data 172, being one of the candidate LOD data 150, 150', 150", includes respective mesh data 174, texture data 178, and a recovery bitstream 179, where the mesh data 174 includes vertex position data 175, connectivity data 176, and edge data 177. The second LOD data 172 represents output of a progressive encoding operation according to the improved techniques disclosed herein. Moreover, the second LOD data 172 may be used as input into another such progressive encoding operation as described herein. These progressive encoding operations may be repeated until a lowest LOD is achieved.

Figure 2:
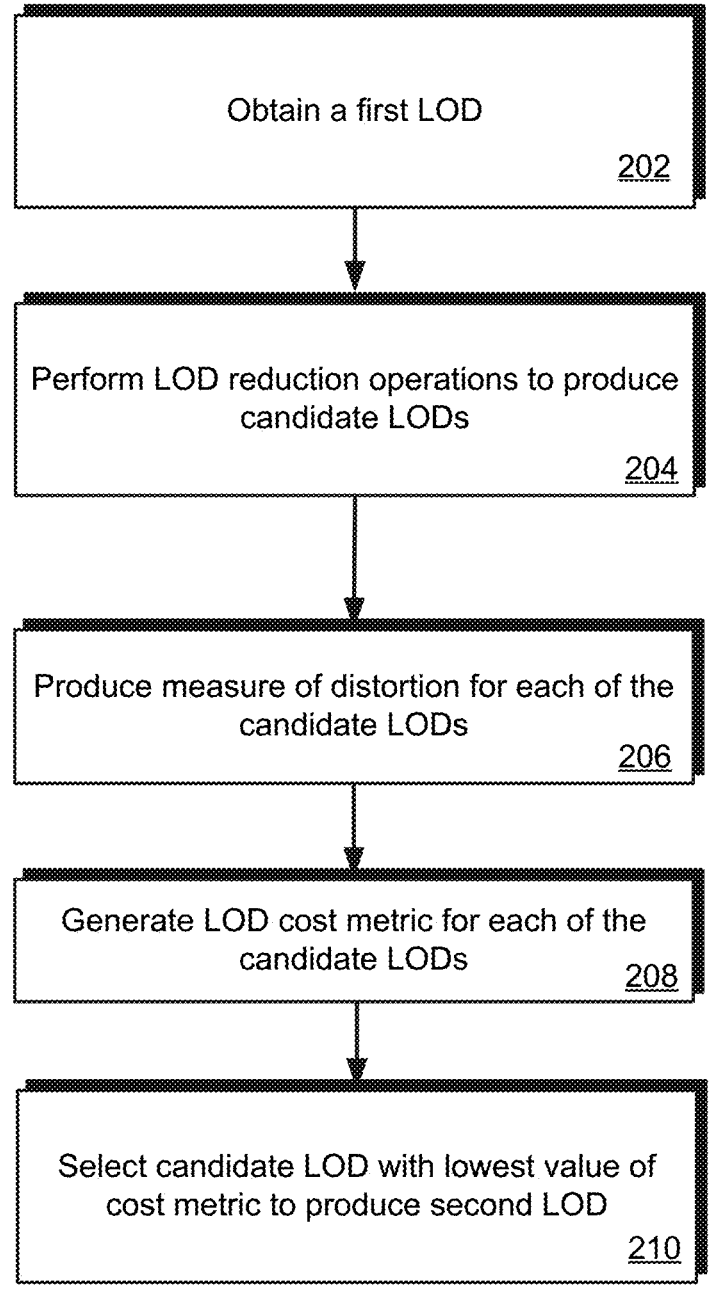
FIG. 2 is a diagram that illustrates an example method of performing the improved techniques within the electronic environment shown in FIG. 1.

FIG. 2 is a flow chart depicting an example method 200 of encoding LOD data. The method 200 may be performed by software constructs described in connection with FIG. 1, which reside in memory 126 of the user device computer 120 and are run by the set of processing units 124.

At 202, the LOD manager 130 obtains data (e.g., first LOD data 132) representing a first level of detail (LOD), the first LOD including a first triangular mesh (e.g., mesh data 134), the first level of detail (LOD) being lower than or equal to a reference LOD that includes a reference triangular mesh.

At 204, the LOD reduction manager 140 performs a plurality of LOD reduction operations on the first LOD to produce a plurality of candidate LODs (e.g., candidate LOD data 150, 150', 150") and a plurality of recovery bitstreams (e.g., recovery bitstream 158 and recovery bitstreams associated with LOD data 150 and 150"), each of the plurality of candidate LODs including a respective candidate triangular mesh (e.g. mesh data 152 and mesh data associated with LOD data 150 and 150") of a plurality of candidate triangular meshes and being lower than the first LOD, each of the plurality of recovery bitstreams being associated with a respective candidate LOD of the plurality of candidate LODs.

At 206, the cost metric manager 160 performs a distortion measurement operation on each of the plurality of candidate LODs to produce a measure of distortion from the reference LOD of a plurality of measures of distortion from the reference LOD corresponding to that candidate LOD.

At 208, the cost metric manager 160 generates a respective value of a LOD cost metric associated with each of the plurality of candidate LODs, the LOD cost metric being based on (i) the measure of distortion of the plurality of measures of distortion corresponding to that candidate LOD and (ii) a size of the recovery bitstream associated with that candidate LOD.

At 210, the selection manager 170 performs a candidate selection operation on the values of the LOD cost metric for each of the plurality of candidate LODs to produce a second LOD (e.g., second LOD data 172), the second LOD being lower than the first LOD, the candidate selection operation being configured to (i) select, as the second LOD, the candidate triangular mesh of the plurality of candidate LODs associated with the smallest of the values of the LOD cost metric and (ii) select the recovery bitstream of the plurality of recovery bitstreams associated with the second LOD, the recovery bitstream enabling a recovery of the first LOD from the second LOD.

Figure 3:
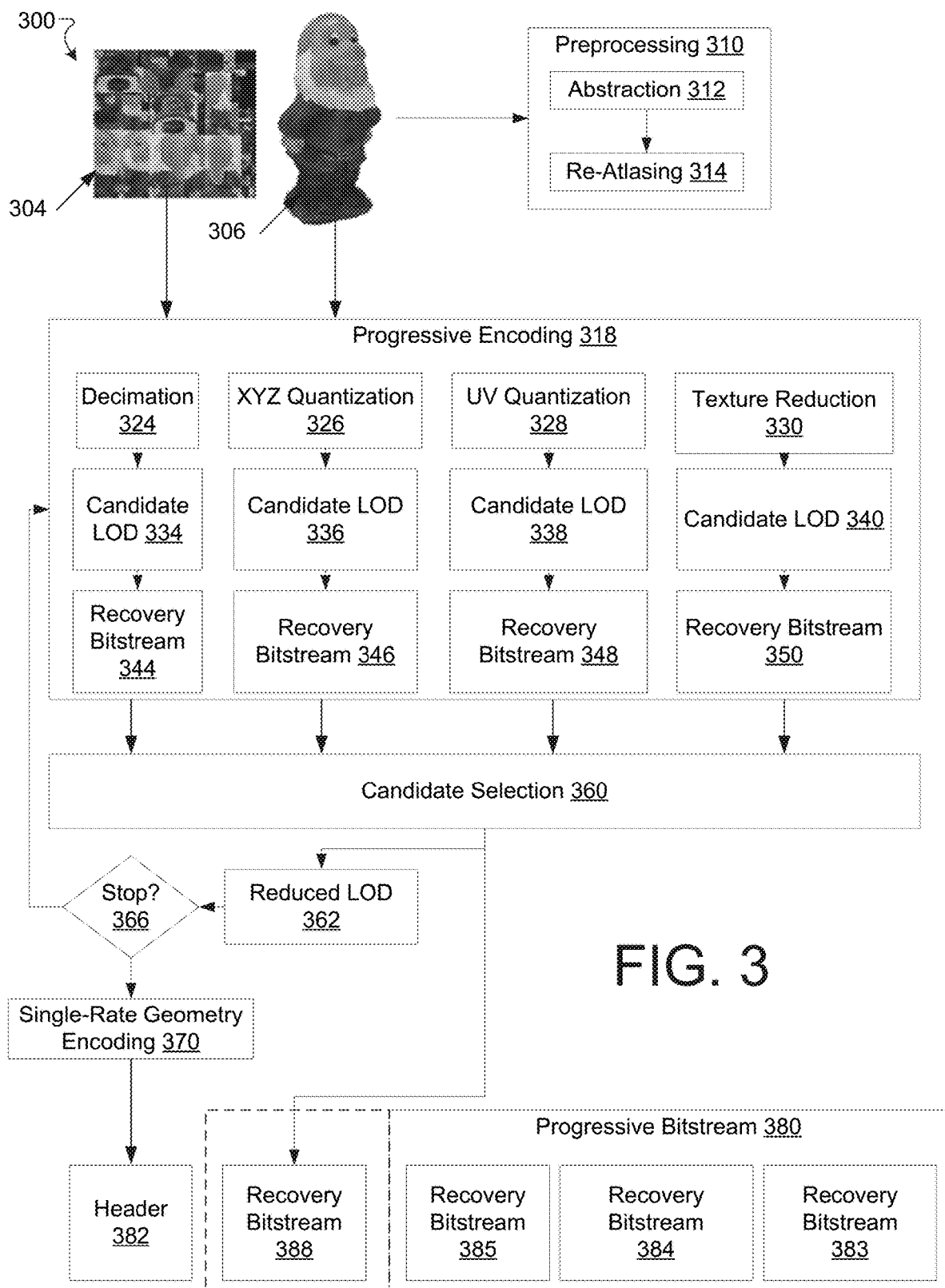
FIG. 3 is a diagram that illustrates a cost-driven framework for progressive compression of textured meshes within the electronic environment shown in FIG. 1.

FIG. 3 is a diagram that illustrates a cost-driven framework 300 for progressive compression of textured meshes. The framework 300 takes as input a reference LOD including a reference texture atlas 304 and a reference mesh 306 representing a surface of a three-dimensional object. The reference LOD is the highest LOD and is an input into the cost-driven progressive encoding scheme described herein.

As illustrated in FIG. 3, the LOD reduction manager 140 performs a preprocessing operation 310. The preprocessing operation 310 includes a mesh abstraction operation on the reference mesh 306 to produce a coarse mesh called an abstraction mesh 312. The preprocessing operation also includes a re-atlasing operation on the reference texture atlas 304 and the abstraction mesh 312 to produce an abstraction texture atlas 314.

In some implementations, to generate the abstraction mesh 312, the LOD reduction manager 140 performs a sequence of mesh decimation operations on the reference mesh 306 until the measure of distortion between the abstraction mesh 312 and the reference mesh 306 is greater than a specified distortion value. In generating the abstraction mesh 312, the LOD reduction manager 140 does not use any information regarding the reference texture atlas 304. Further details about the abstraction mesh 312 and the abstraction texture atlas are disclosed with regard to FIG. 4.

Figure 4:
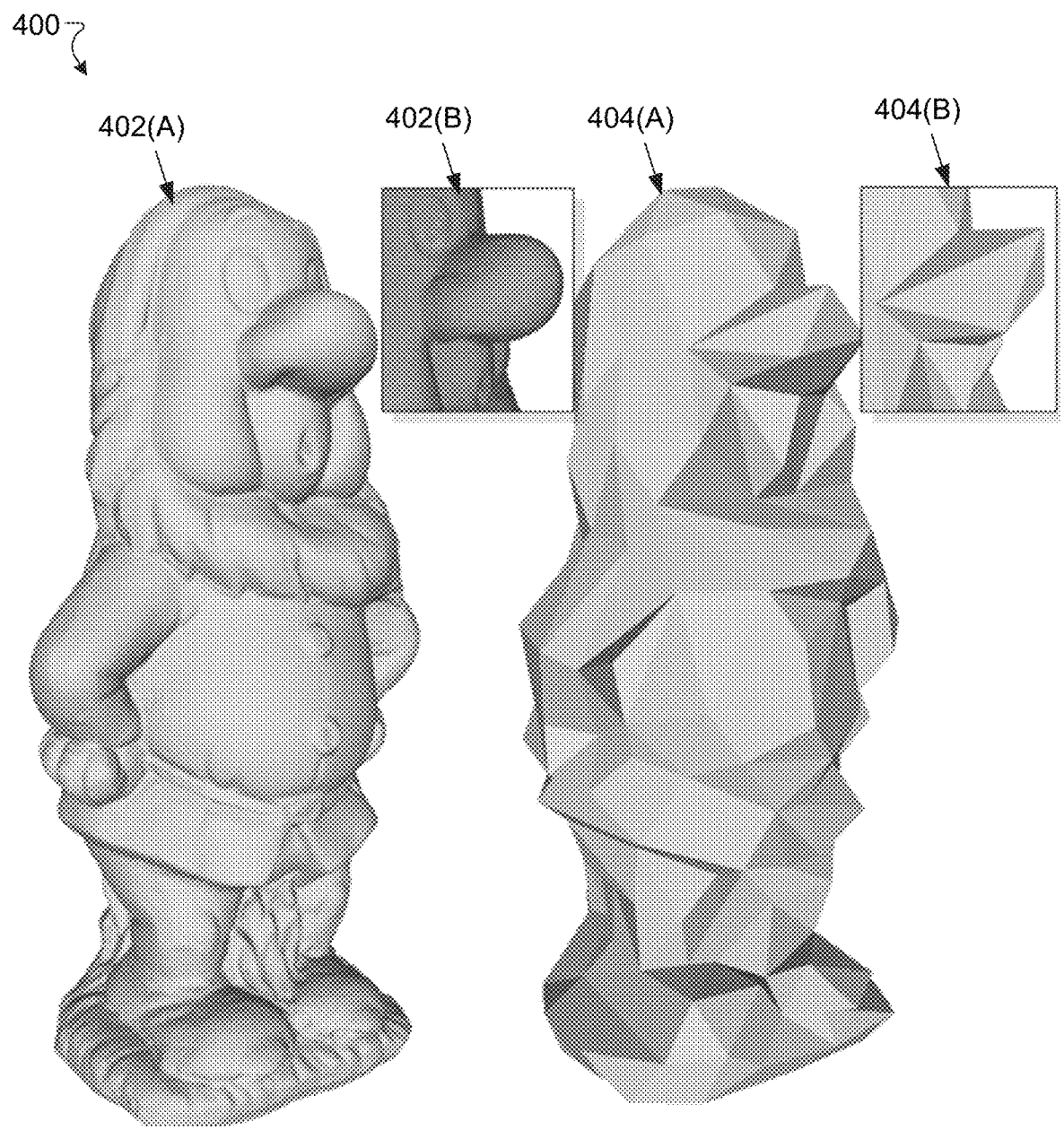
FIG. 4 is a diagram that illustrates an abstraction generated by mesh decimation within the electronic environment shown in FIG. 1.

FIG. 4 is a diagram that illustrates an example abstraction process 400. The abstraction process 400 involves using mesh decimation operations, starting with the reference mesh 402(A) and ending with the abstraction mesh 404(A). Further detail of a portion of the reference mesh 402(B) and the abstraction mesh 404(B) are also shown. The reference mesh 402(A) has 1.3 million vertices, while the abstraction mesh 404(A) has 300 vertices. In some implementations, the abstraction mesh 404(A) is defined to be that mesh resulting from repeated mesh decimation operations that is as coarse as possible while having a distortion value not exceeding a user-specified maximum distortion. In some implementations, the mesh decimation uses a quadric error metric until the multi-scale structural similarity (MS-SSIM) distortion of a textured abstraction exceeds a user-defined tolerance.

Some input textured meshes are generated using automated algorithms. Such algorithms often create a complex texture atlas with fragmented and irregular texture seams. An extreme case occurs when all triangle edges correspond to seams. In other cases, many texture mapping methods are not aware of a LOD and are unfit for effective progressive compression. Such a scenario is illustrated in FIGS. 5A and 5B.

Figure 5A:
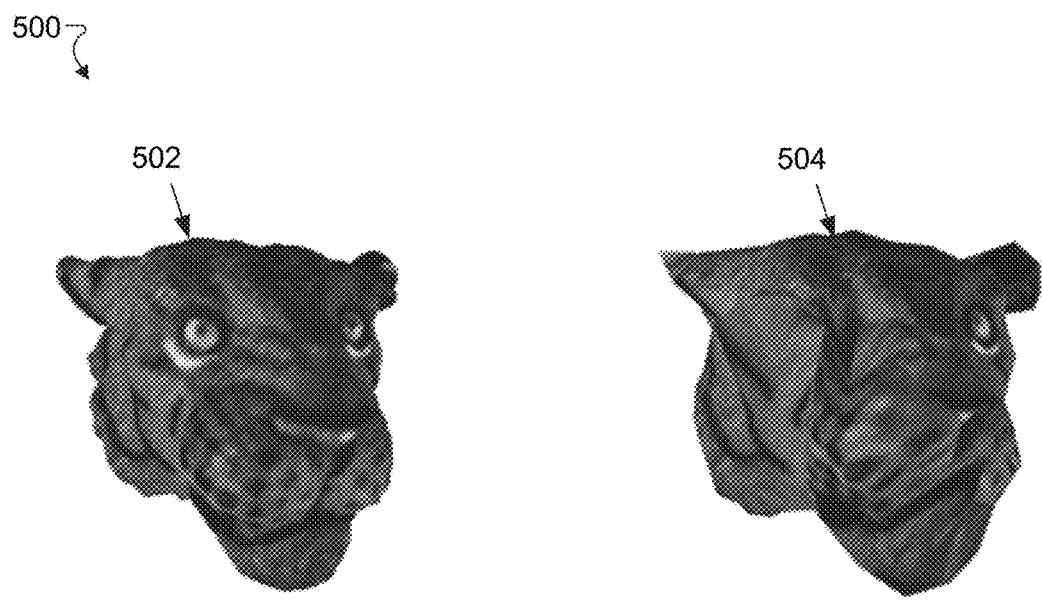
FIG. 5A is a diagram that illustrates example artifacts due to texture seams during mesh decimation within the electronic environment shown in FIG. 1.

FIG. 5A is a diagram that illustrates example artifacts 500 due to texture seams during mesh decimation. FIG. 5A shows another example reference mesh 502 and a mesh 504 of a lower LOD resulting from a mesh decimation operation. In this case, the mesh 504 suffers from high visual distortion relative to the reference mesh 502.

Figure 5B:
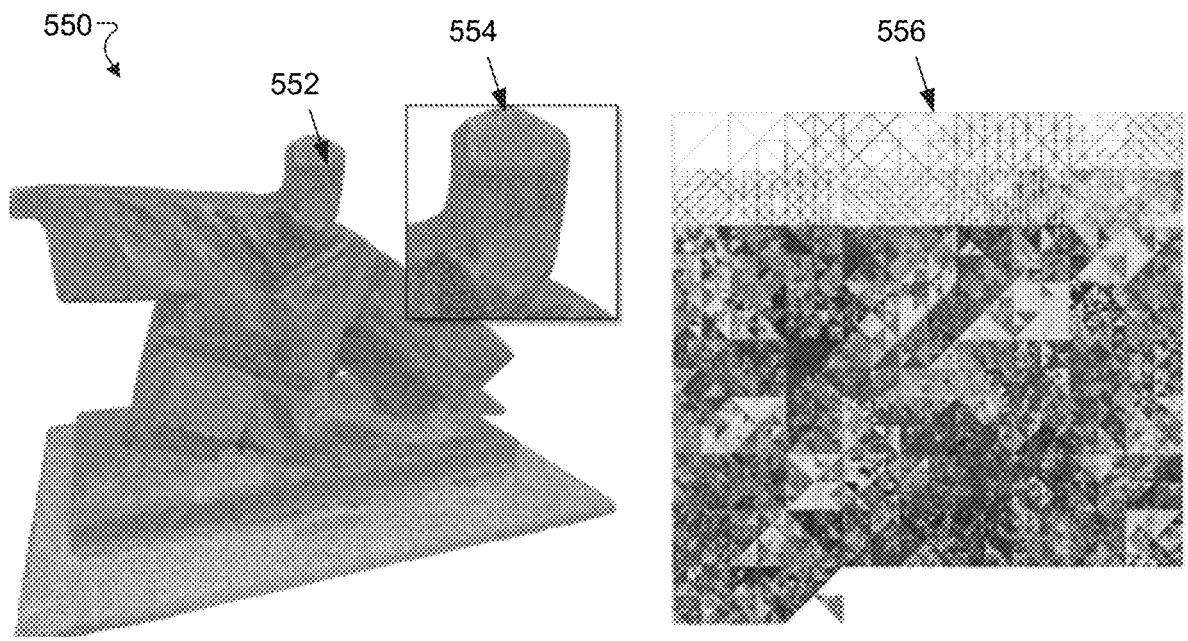
FIG. 5B is a diagram that illustrates example seams as edges of a mesh within the electronic environment shown in FIG. 1.

FIG. 5B is a diagram that illustrates an example mesh 552 (with detailed view 554) having seams as the edges of the mesh. The seams are shown in associated texture atlas 556. During decimation, the triangles having UV coordinates in different texture patches are merged. Thus, the initial texture patches are not respected and the area covered by the mesh triangles tend to shrink or expand as the additional mesh decimation operations are performed, as can be seen in FIG. 5A. One solution involves preserving the seams as much as possible; nevertheless, the quality of the lower LODs (having coarser meshes) drops with additional mesh decimation operations.

Figure 6A:
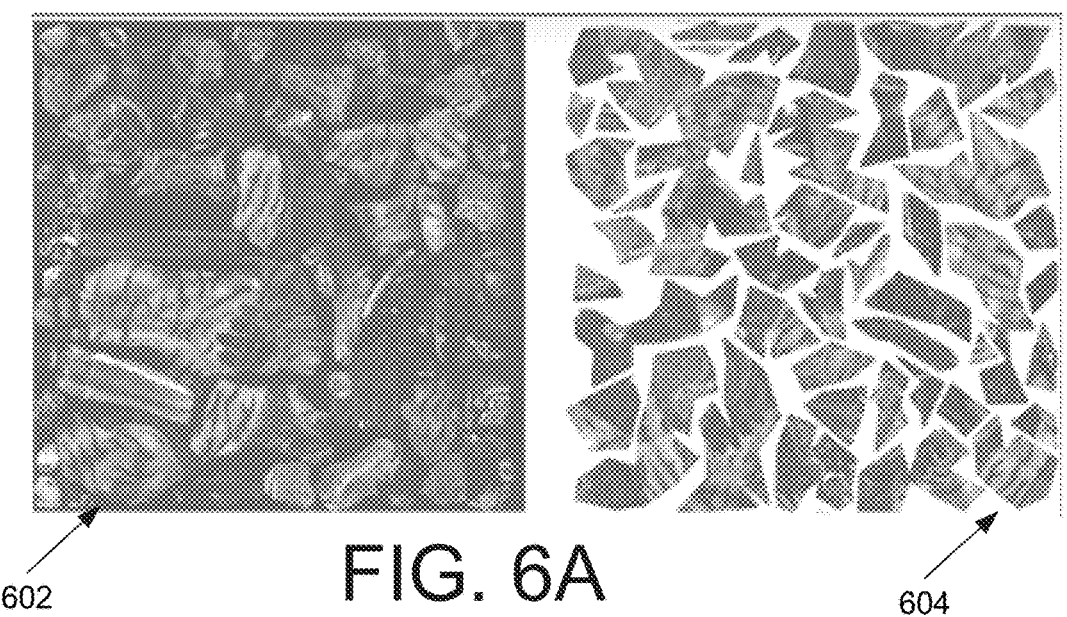
FIG. 6A is a diagram illustrating an example re-atlasing within the electronic environment shown in FIG. 1.
Figure 6B:
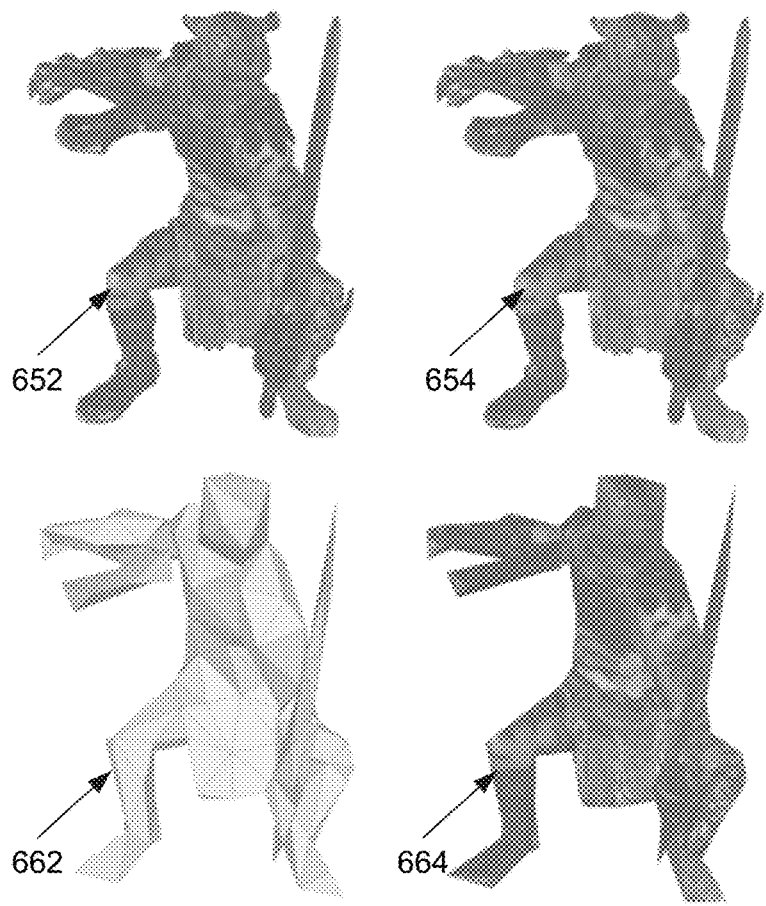
FIG. 6B is a diagram illustrating example seams before and after re-atlasing and a resulting abstraction and textured abstraction within the electronic environment shown in FIG. 1.

FIG. 6A is a diagram illustrating an example re-atlasing operation on a reference texture atlas 602 to produce an abstraction texture atlas 604. FIG. 6B is a diagram illustrating example seams before 652 and after 654 re-atlasing via the abstraction mesh, and a resulting abstraction 662 and textured abstraction 664. In the re-atlasing operation, the input mesh is re-parametrized onto the abstraction mesh 662, while reducing fragmentation and length of texture seams. The mesh decimation operations are directed toward the abstraction mesh 662 while being constrained to preserve the seams of the new atlas 654.

To effect the preservation of the seams in a re-atlasing operation, all triangular faces of the input mesh 652 are arranged such that each cluster corresponds to one triangular face of the abstraction mesh 662. A texture patch is then formed for each cluster by generating a planar parameterization onto the corresponding abstraction triangle. Depending on the complexity of the abstraction mesh 662, the new (abstraction) texture atlas 604 may still include a large number of seams which constrain decimation operations and are costly to single-rate encode as each seam uses duplicated UV coordinates. Accordingly, the triangular texture patches are packed by attaching the triangles as much as possible so as to exchange a low number of texture seams for limited texture distortion. All texture seams which are attached are first saved as "virtual seams," which are preserved during the mesh decimation processes. After performing the re-atlasing operation, both the input (reference) mesh 652 and the abstraction mesh 654 are assigned new UV coordinates in the newly generated (abstraction) texture atlas 604, from which the textured abstraction atlas 664 is produced.

Returning to FIG. 3, the results of the preprocessing operation 310 are used in a progressive encoding operation 318, which includes a plurality of LOD reduction operations including a mesh decimation operation 324, an XYZ quantization operation 326, a UV quantization operation 328, and a texture reduction operation 330.

The progressive encoding operation 318 is configured to produce a stream of refinement via quantization and LOD generation using a fine-to-coarse simplification approach. As an initial step, the progressive encoding operation 318 includes an initial quantization step in which a global, uniform quantization operation is performed for XYZ (vertex) coordinates and UV (texture) coordinates by converting the continuous, real coordinates into discrete, integer coordinates. The XYZ coordinates use $Q_g$ bits and the UV coordinates use $Q_t$ bits; the initial values of $Q_g$ and $Q_t$ are large enough to yield a negligible distortion.

The progressive encoding operation 318 is configured to perform a plurality of LOD reduction operations on meshes of LODs to produce meshes of candidate LODs. As shown in FIG. 3, the LOD reduction operations include the following:

Mesh decimation operation 324: a batch of seam-preserving edge-collapse operations that use the quadric error metric extended to five dimensions (i.e., XYZ and UV coordinates) for textured meshes. Produces a candidate LOD 334 and a recovery bitstream 344.

XYZ quantization operation 326: the bit value $Q_g$ is decremented by moving each vertex at a center of a cell of a three-dimensional lattice of the coarser quantization lattice. In some implementations, $Q_g$ is decremented by one; in such an implementation, a cell of the coarser lattice contains eight cells from the finer lattice. Produces a candidate LOD 336 and a recovery bitstream 346.

UV quantization operation 328: the bit value $Q_t$ is decremented by moving each vertex at a center of a cell of a two-dimensional lattice of the coarser quantization lattice. In some implementations, $Q_t$ is decremented by one; in such an implementation, a cell of the coarser lattice contains four cells from the finer lattice. Produces a candidate LOD 338 and a recovery bitstream 348.

Texture reduction operation 330: in some implementations, this takes the form of a progressive JPEG compression operation. Produces a candidate LOD 340 and a recovery bitstream 350.

In some implementations, there are other LOD reduction operations.

Each of the geometry-based LOD reduction operations, the mesh decimation operation 324, the XYZ quantization step 326, and the UV quantization operations 328, introduces an increase in the measure of distortion $\Delta_D$ while reversing a LOD reduction operation during a decoding uses a bitrate $\Delta_R$. In some implementations, the measure of distortion $\Delta_D$ is a perceptual distortion metric (i.e., distortions from multiple points of view). In some implementations, the measure of distortion $\Delta_D$ is an absolute value of a sum over displacements of one of the XYZ and UV coordinates. In some implementations, the measure of distortion $\Delta_D$ is an absolute value of a sum over displacements of the XYZ and UV coordinates.

In some implementations, the cost metric for each LOD reduction operations for a given LOD is equal to the product of the measure of distortion and the bitrate, $\Delta_D \Delta_R$ for that LOD reduction operation at that LOD. This particular cost metric is referred herein as the agony. There are other cost metrics depending on the measure of distortion and bitrate. In some implementations, the cost metric is proportional to the product of a power of the measure of distortion and a power of the bitrate.

One may plot the measure of distortion $\Delta_D$ against the bitrate $\Delta_R$ to produce a rate-distortion (R-D) curve. The R-D curve usually reflects a tradeoff between the measure of distortion and the bitrate. The R-D curve is represented by stairsteps over the tradeoff curve, such that the measure of distortion $\Delta_D$ is constant between two LODs.

The cost metric manager 170 writes the values of the measure of distortion $\Delta_D$ and the bitrate $\Delta_R$ to the memory 126 (e.g., cost data 162). In some implementations, the cost metric manager 170 writes the agony, or more generally, the values of the cost metric, to the memory 126. The compression computer 120 (e.g., the selection manager 170) then selects, via a candidate selection operation 360, the smallest value of the cost metric from the cost data 162, and the candidate LOD data (e.g., candidate LOD data 334, 336, and 338) associated with that smallest value of the cost metric to produce the reduced LOD 362. It is that candidate LOD data 334, 336, and 338, including the associated mesh data and texture data, that was output from the current LOD reduction operation and may be input into a next LOD reduction operation. In some implementations, the above-described process may be repeated until a specified maximum distortion has been achieved. In some implementations, the specified maximum distortion is the same used to derive the abstraction LOD. It should be noted that the reduced LOD 362 achieved by the above-described process is not necessarily the abstraction LOD as the abstraction LOD is derived by a sequence of mesh decimation operations.

As shown in FIG. 3, the mesh data of the reduced LOD 362, if the stop condition 366 is achieved, is single-rate encoded with lowered quantization bits to produce a single-rate geometry encoding 370. In some implementations, the bits per vertex used in such an encoding is less than 2. In some implementations, the bits per vertex used in such an encoding is between 1.0 and 1.5. In some implementations, the bits per vertex used in such an encoding is about 1.3 on average.

The constraint to maintain the input mesh connectivity for the highest LOD leads to a common batched mesh decimation paradigm to be applied. In some implementations, the mesh decimation operations are performed using batches of independent edge collapse operators sorted in a priority queue.

During decoding, a canonical ordering of the vertices of a mesh is used to locate the vertex split operators which reverse (i.e., invert) the edge collapse operators used in the mesh decimation operations, within the current batch. Such a canonical ordering differs from the ordering of edge collapse operators applied during mesh decimation operations, which depends on a priority queue. Accordingly, in some implementations, the collapsed edges produced by the edge collapse operators for an independent set. That is, the collapsed edges are sufficiently separated from each other such that each edge can be collapsed without interfering with the other edges of the plurality of edges (e.g., edge data 155). In such an implementation, an edge cannot be collapsed if one of the vertices of its patch is the result of a previous edge collapse.

The quadric error metric extended to five dimensions to account for XYZ and UV coordinates as described above preserves both input mesh geometry and re-atlased (abstraction) texture coordinates, and also handles texture seams. The computation of this error metric produces, for each edge, an optimal vertex and texture atlas attributes of the resulting vertex upon collapse which minimizes the error defined by the metric. In each batch, the edge collapse operators are organized in a priority queue, where the priority indicates the error introduced by the edge collapse operation. The next mesh decimation operation selected is that which produces the smallest value of the error metric. The mesh decimation operations are stopped when the value of the error metric is greater than a specified percentile (e.g., 30%) of the errors computed for the plurality of edges represented by the edge data of the initial LOD data of the batch.

For the mesh decimation operations, a degree of freedom is a type of collapse (i.e., split) operation: a half-edge collapse operation and a full-edge collapse operation. In the full-edge collapse operation, the location of the merged vertex is determined by minimizing the local error using the above-described error metric, at the cost of encoding two residual vectors between the merged vertex and its two ancestors. In the half-edge collapse operation, the location of the merged vertex is restricted to one of its two ancestors. While the half-edge collapse operations introduce a larger local error than that introduced for the full-edge collapse operation, only a single residual vector is encoded to reverse the operation during decoding.

In some implementations, a mesh decimation operation includes a hybrid of half-edge and full-edge collapse operations. In some implementations, the hybrid includes performing a first batch of half-edge collapse operations and then performing a second batch of full-edge collapse operations after performing the first batch of half-edge collapse operations. Such a hybrid improves the rate-distortion tradeoff because a dense (initial) mesh can achieve lower errors using half-edge collapse operations while coarse, later meshes should use full-edge collapse operations to achieve a lower error. The LOD at which the hybrid switches from half-edge collapse operation to full-edge collapse operation is chosen to minimize the agony.

As indicated in FIGS. 5A and 5B, seam-preserving mesh decimation operations avoid producing artifacts around texture seams. In addition, the preservation of the texture seams and the above-described virtual seams of the re-atlas (abstraction) texture enables the mesh decimation operations toward abstraction. Along these lines, seam-preserving mesh decimation operations are achieved by constraining the edge-based operations to obey a set of rules; these rules are described with regard to FIG. 7.

Figure 7:
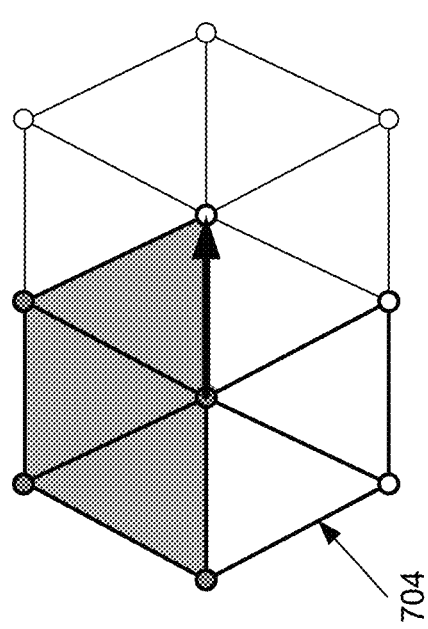
FIG. 7 is a diagram illustrating seam-preserving operators within the electronic environment shown in FIG. 1.
Figure 7:
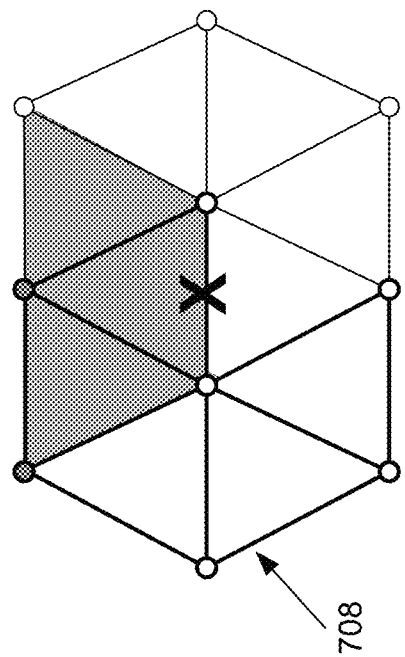
Figure 7:
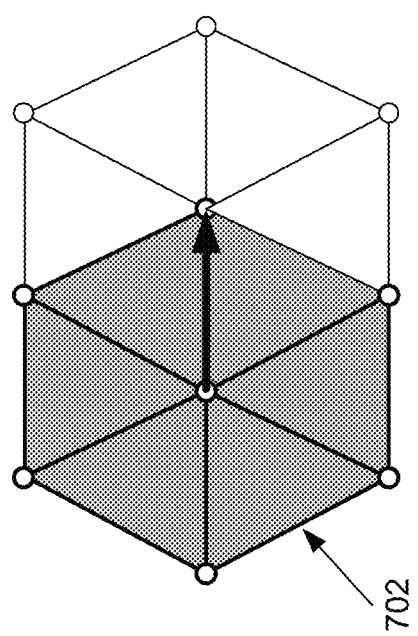
Figure 7:
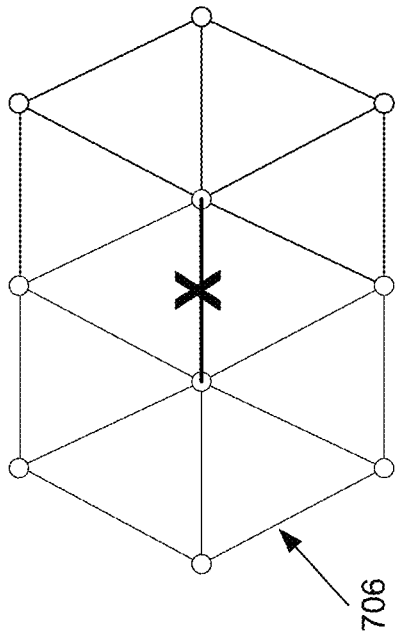

FIG. 7 is a diagram illustrating seam-preserving operators. The rules illustrated in FIG. 7 are as follows:
  If one of the edge vertices is on a seam, then perform only a half-edge collapse (702 to 704) operation toward the seam.
  If two vertices of an edge are on a seam which is not the edge itself (706 and 708), then do not collapse the edge. Rather, a set of edges that are candidates for a collapse operation are selected.

Returning to FIG. 3, it is noted that the LOD reduction operations, including the mesh decimation operations 324 and the XYZ and UV quantization operations 326 and 328, are to be reversed in a decoding operation. For example, an inverse mesh decimation operation includes batches of independent vertex operations. Each such batch uses combinatorial information (e.g., which vertices to split and how to update the connectivity during a vertex split) and continuous information (e.g., where to relocate the two vertices after splitting in XYZ-UV space).

After each batch of mesh decimation operations, the vertices of the mesh are indexed (ordered) according to a canonical spanning tree traversal, and the vertices to split are identified by a sequence of binary symbols. In some implementations, the sequence is shortened by omitting the vertices that cannot be split due to the constraints of having an independent set of vertex split operations. For each vertex split operation, the geometry data (e.g., the mesh data), connectivity data, and texture mapping data are encoded after prediction.

The connectivity data are encoded first to help predict the geometry represented by the geometry data. For example, when performing a vertex splitting operation on a vertex to produce two vertices, recovering the connectivity data includes producing a connection between the two vertices and their neighbors. Specifically, manifold and non-manifold cases are encoded separately because the surface represented by the LOD data remains locally 2-manifold. Because an edge collapse operation can transform a non-manifold connectivity into a manifold connectivity and vice-versa, a binary symbol is used to indicate a topological change. For non-manifold connectivity cases, specified binary symbols are used to indicate which vertices result from an edge collapse operation. For manifold connectivity cases, an umbrella of a split vertex is split into a first part and a second part. The first part is formed by vertices that are connected to only one vertex of an un-collapsed edge, either the first or second, which forms two sets. The second part is formed by the two vertices that delineate the boundary of these two sets which are connected to both edge vertices forming two new triangles. During decoding, these two vertices are identified and its connected vertex assigned to each set. For encoding the boundary vertices of the umbrella, the two boundary vertices that are furthest apart (i.e., the diameter of the umbrella) are used as a predictor for deriving the direction of the split edge. Such a prediction is discussed in further detail with regard to FIG. 8.

Figure 8:
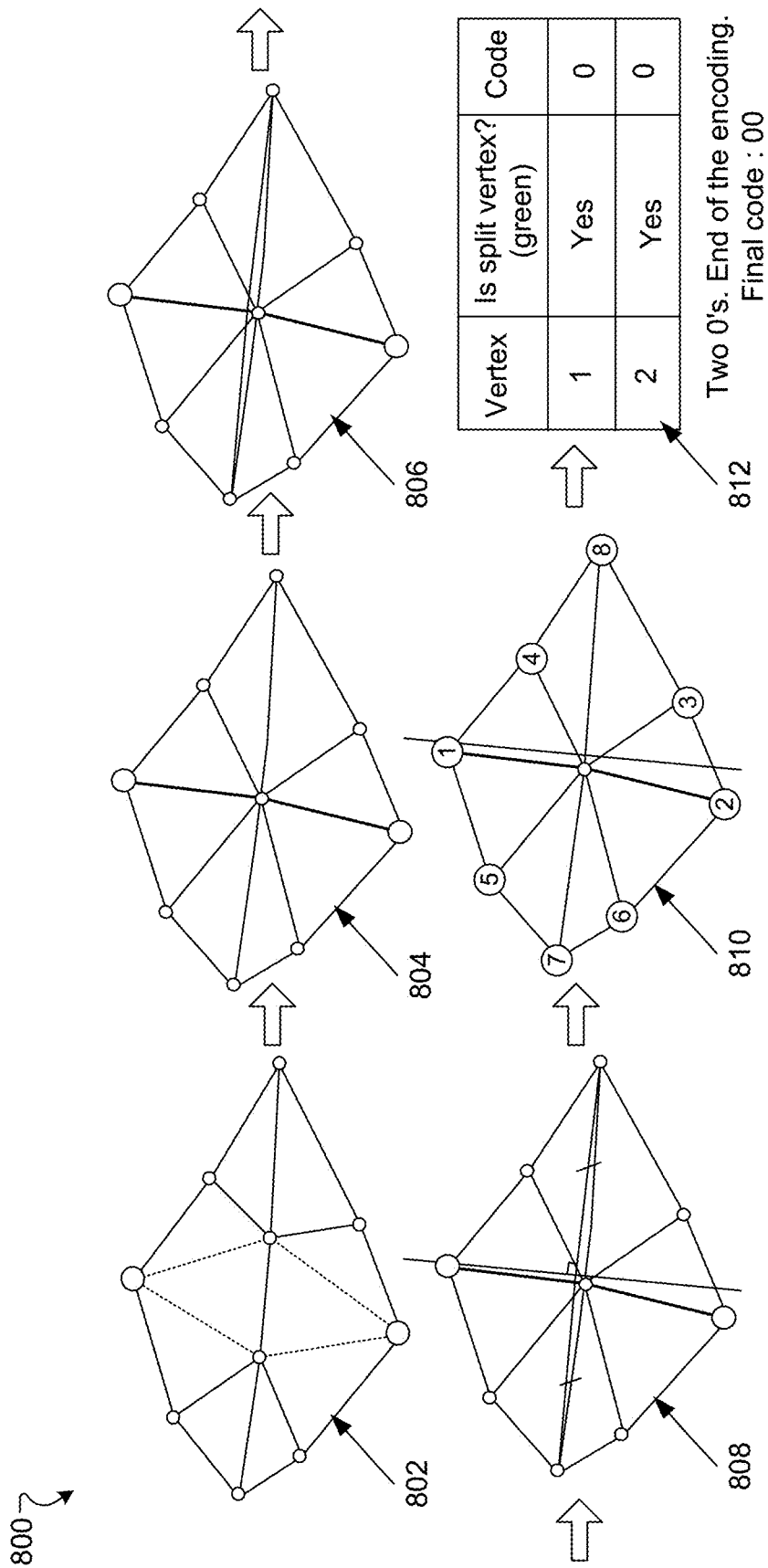
FIG. 8 is a diagram illustrating a diameter-based prediction within the electronic environment shown in FIG. 1.

FIG. 8 is a diagram illustrating a diameter-based prediction. As shown in FIG. 8, the shaded region in umbrella 802, representing two triangular faces, is collapsed into umbrella 804 via a full-edge collapse operation. In the umbrella 806, the diameter of the umbrella is identified. In the umbrella 808, a bisector plane of the diameter is generated. In the umbrella 810, the vertices are indexed according to the probability that that vertex is a split vertex. In some implementations, this probability is proportional to the distance to the bisector plane of the diameter vertices. In the table 812, it is determined that vertices 1 and 2, the two vertices closest to the bisector plane, are split vertices as labeled in 810.

The locations of the two vertices $v_1$ and $v_2$ after a vertex split operation uses two residual vectors to reverse a full-edge collapse, and one residual vector for reversing a half-edge collapse. The decoded connectivity may be leveraged to perform two independent and sequential barycentric predictions for $v_1$ and then $v_2$ (for a full-edge collapse operation) using the vertices of their respective patch. Once $v_1$ is decoded, then its location is used for a barycentric prediction of $v_2$.

It is noted that the increase in distortion introduced by a coarse quantization is smaller for a coarse mesh than a dense mesh. Along these lines, an adaptive quantization operation includes decreasing the precision of vertex or texture (XYZ or UV) coordinates as the LOD reductions progress. In some implementations, a quantization operation decrements by one the number of quantization bits for a coordinate type (e.g., XYZ or UV). Such a quantization operation is performed when its agony is less than that produced by other types of operations (e.g., mesh decimation). Reversing this operation in decoding involves relocating each vertex to the center of a smaller cell in a denser lattice. Predicting the new locations may be accomplished by generating a distance to a centroid of neighboring vertices of a cell of a parent lattice. The adaptive quantization operation helps improve the compression rate by using single-rate compression with lower quantization bits, shifting the R-D curve to the left.

The UV texture atlas coordinates may be predicted similarly to a parallelogram prediction, which uses the XYZ and UV coordinates of the triangle vertices to predict new texture coordinates.

As shown in FIG. 3, the preprocessing operation 310 produces a progressive encoding operation 318. The progressive encoding operation 318 uses, in some implementations, a progressive JPEG encoding algorithm to produce a texture recovery bitstream 350. The texture recovery bitstream 350, along with the geometry recovery bitstream 344, 346, or 348, is used in a geometry and texture multiplexing operation.

The geometry and texture multiplexing operation is configured to multiplex the progressive geometry and texture data from coarse to dense, as better performance is obtained than by simple proceeding from coarse to dense. This is made possible because the geometry and texture data are independent. Specifically, starting from the LOD that pairs the coarsest mesh with the coarsest texture, a refinement of either the geometry or the texture is selected based on the smallest agony.

Figure 9:
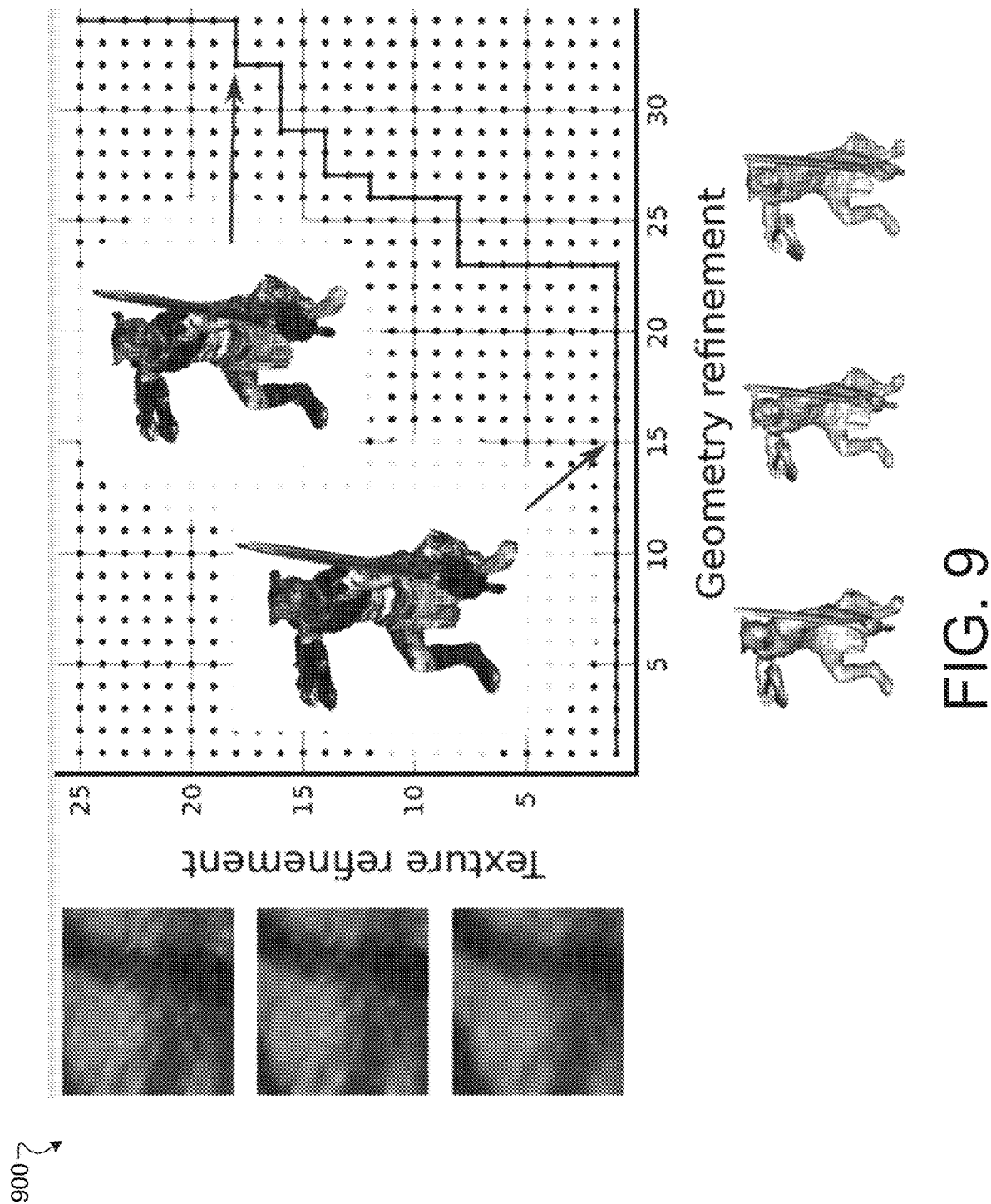
FIG. 9 is a diagram illustrating geometry and texture multiplexing within the electronic environment shown in FIG. 1.

FIG. 9 is a diagram illustrating geometry and texture multiplexing via a graph 900. Each dot in the graph 900 represents a pair (mesh LOD, texture LOD), and multiplexing amounts to finding the best path connecting the left-bottom and right-top dots.

Returning to FIG. 3, an output of the above-described cost-driven progressive encoding is a progressive bitstream 380. The progressive bitstream 380 includes a header 382 generated from the single-rate geometry encoding operation 370 on the lowest LOD 362. The header 382 records the encoded mesh of the lowest LOD 362, the lowest resolution texture encoded via progressive JPEG, the number of bits used for XYZ and UV coordinates, and the bounding box required to reverse the quantization operations. The progressive bitstream 380 also includes a heterogeneous series of geometry and/or texture refinements 383, 384, 385, . . . . It is noted that a new recovery bitstream, e.g., recovery bitstream 388, is placed in front of older recovery bitstreams 383, 384, 385, i.e., closer to the header 382. Such a placement is used in a decoding operation that reverses the encoding operations.

A geometry refinement may be either a batch of XYZ quantization refinements, a batch of UV quantization refinements, or a batch of mesh refinement operations. In some implementations, the batch or refinement operations may be organized as follows:

Vertex split location. The bits used to recover the bit-mask of the independent set of vertices to split are encoded in a canonical order along a spanning tree.

Connectivity. The connectivity symbols after diameter-based prediction (FIG. 8) are encoded using an entropy coder.

Geometry. The quantized residuals after barycentric predictions are entropy encoded.

For certain half-edge collapse operations (e.g., half-edge collapse toward a seam), the orientation of the half-edge is recorded via extra binary symbols. Other half-edge collapse operations do not use extra bits as they are performed in a canonical orientation.

Texture coordinates. The quantized residuals of UV coordinates are entropy encoded.

The indices of texture regions for collapse operations located near the seams are entropy encoded such that the UV coordinates are assigned to the correct texture location.

Figure 10A:
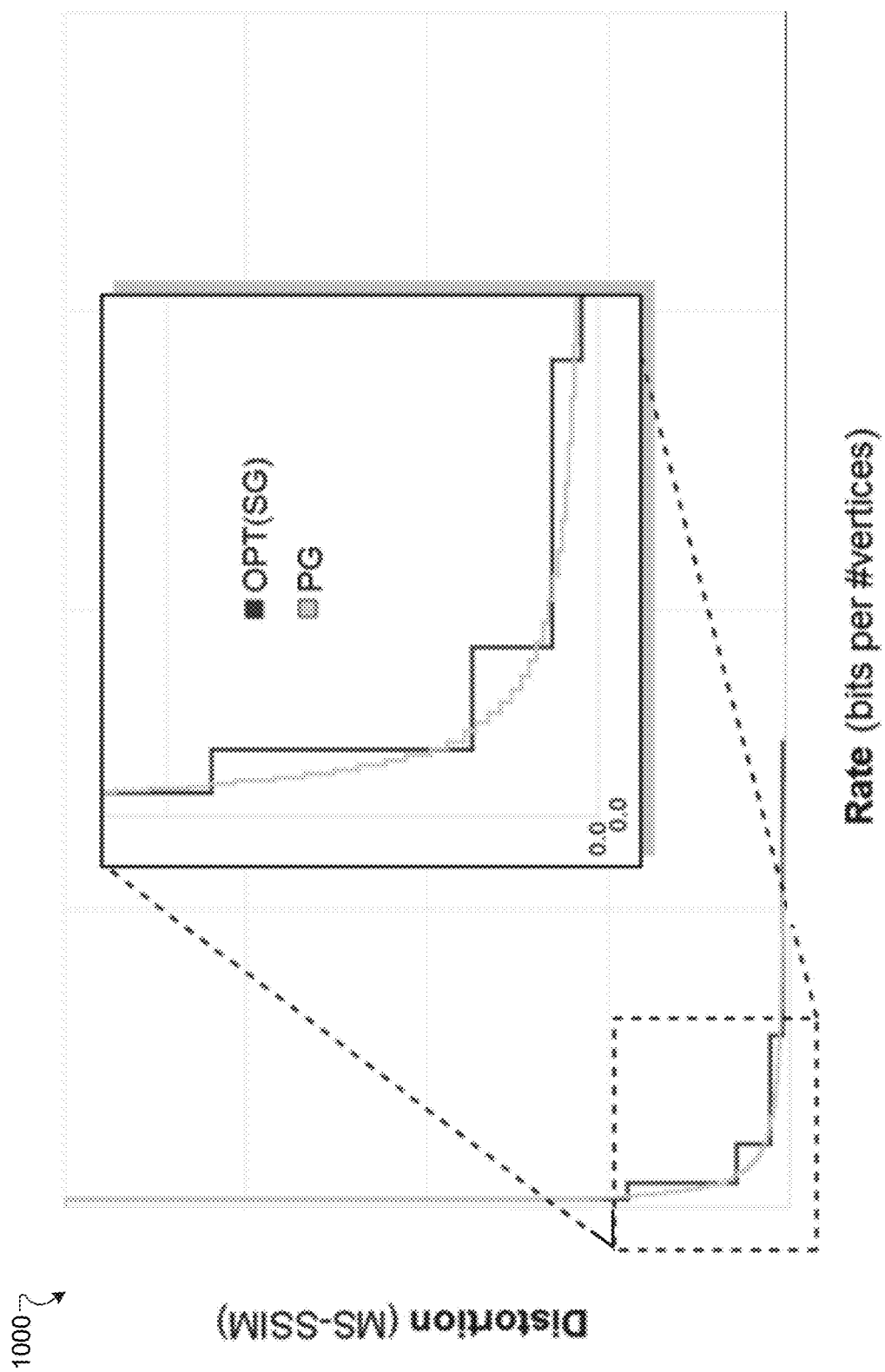
FIG. 10A is a diagram illustrating an example rate-distortion curve within the electronic environment shown in FIG. 1.
Figure 10B:
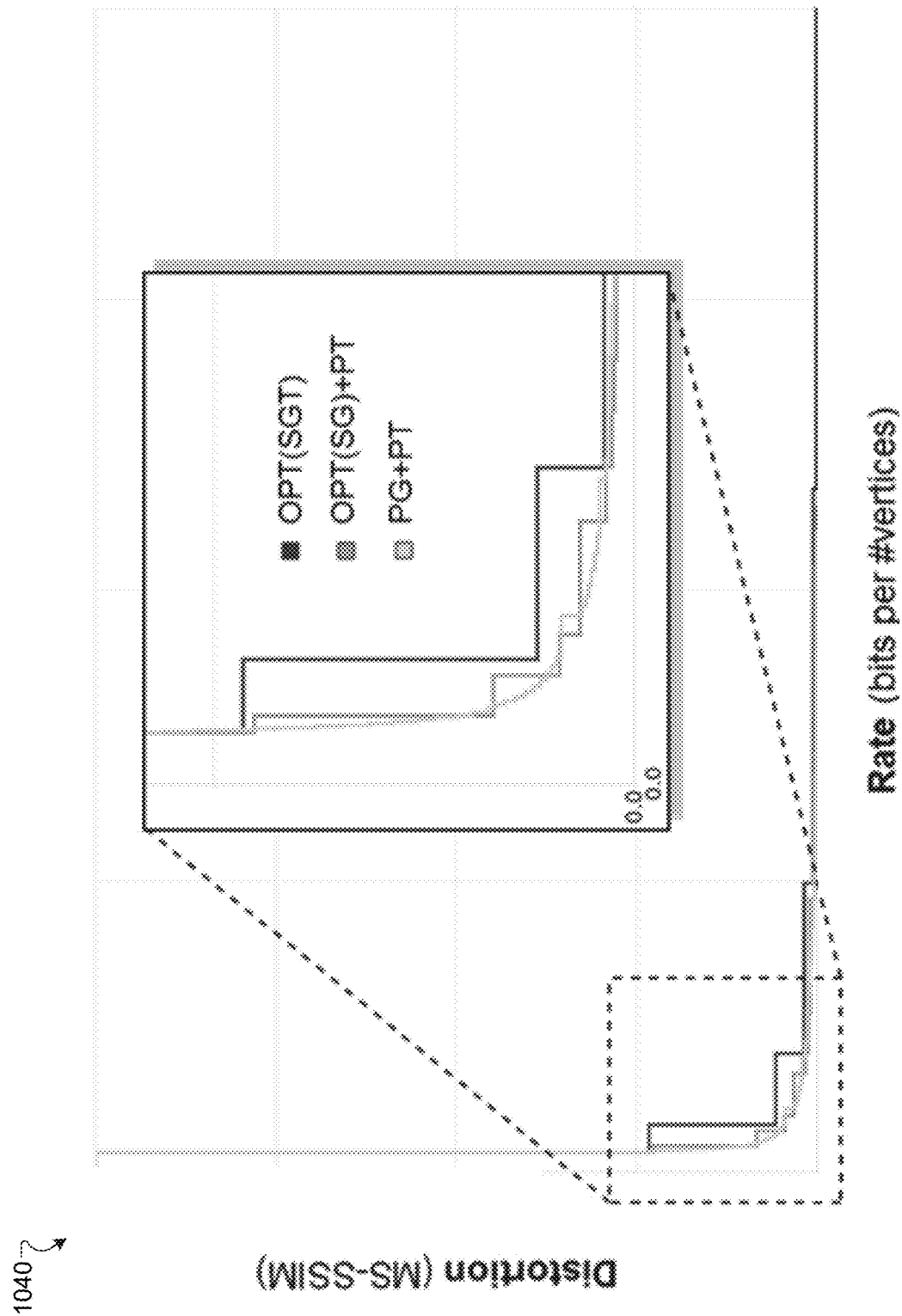
FIG. 10B is a diagram illustrating another example rate-distortion curve within the electronic environment shown in FIG. 1.
Figure 10C:
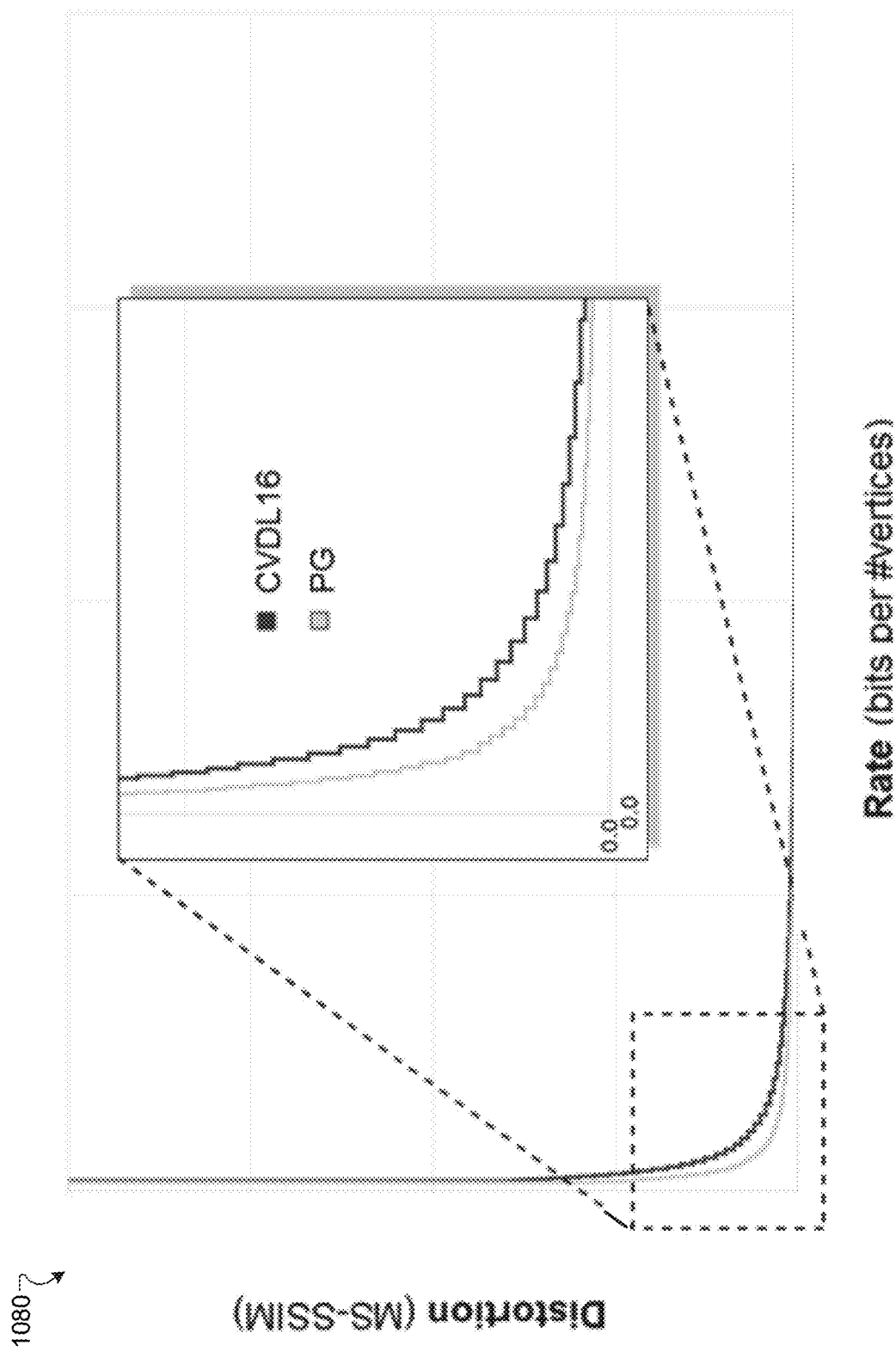
FIG. 10C is a diagram illustrating another example rate-distortion curve within the electronic environment shown in FIG. 1.

Results of the above-described cost-driven progressive encoding framework are discussed with regard to FIGS. 10A, 10B, and 10C. FIGS. 10A, 10B, and 10C are diagrams illustrating example rate-distortion curves of a number of LOD sequences, including the above-described cost-driven progressive encoding framework. The following LOD sequences are described:

OPT(SG): Optimal subset of single-rate geometry without texture costs. The full resolution texture is assumed to have been sent.

PG: Progressive geometry without texture costs. The full resolution texture is assumed to have been sent.

OPT(SGT): Optimal subset of single-rate geometry sent with single-rate texture.

OPT(SG)+PT: Optimal subset of single-rate geometry, multiplexed with progressive texture.

PG+PT: Progressive geometry multiplexed with progressive texture, i.e., the above-described cost-driven progressive encoding framework.

Figure 11B:
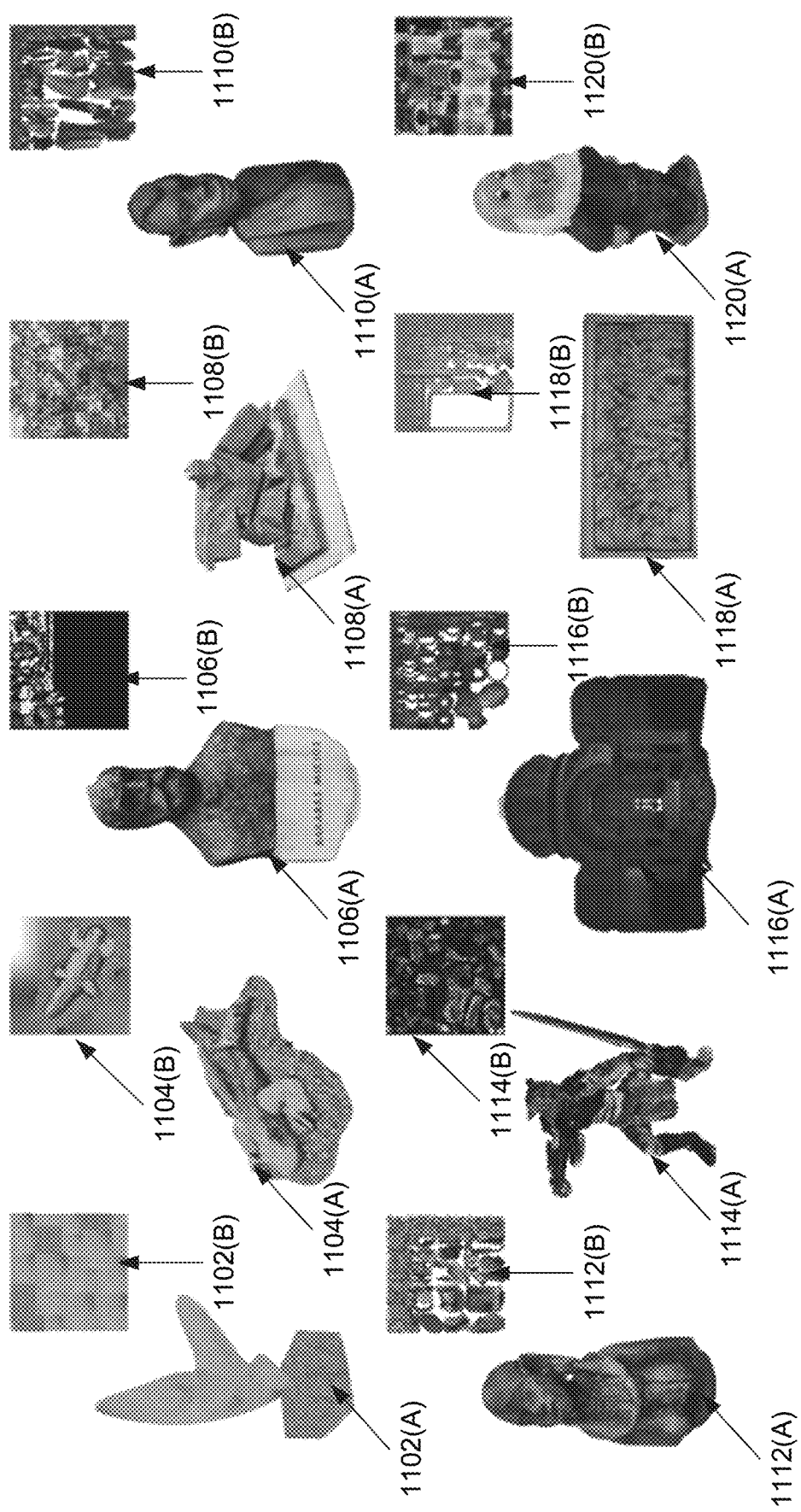
FIG. 11B is a diagram illustrating resulting textured meshes resulting from the improved techniques performed within the electronic environment shown in FIG. 1.

FIG. 10A illustrates a graph 1000 including R-D curves without texture costs for the OPT(SG) and PG LOD sequences on a dataset Tiger (FIG. 11B, 1114(A,B)). The curve corresponding to PG (smooth, lower curve) has a lower agony (0.133725) than that corresponding to OPT (SG) (stair-stepped, upper curve, agony=0.159542).

FIG. 10B illustrates a graph 1040 including R-D curves with texture costs for the OPT(SGT), OPT(SG)+PT, and PG+PT on the re-atlased Tiger dataset. The curve corresponding to PG+PT (smooth, lower curve) has a lower agony (0.461431) than OPT(SG)+PT (finer-stepped, middle curve, agony=0.486700) or OPT(SGT) (coarser stair-stepped, top curve, agony=0.632629).

FIG. 10C illustrates a graph 1040 including R-D curves with texture costs for the PG and a conventional progressive encoding (CVDL16) on the re-atlased Tiger dataset. The curve corresponding to PG (smooth, lower curve) has a lower agony (0.133725) than the CVDL16 (stair-stepped, upper curve, agony=0.0.196941).

The above graphs in FIGS. 10A-10C indicate that the above-described cost-driven progressive encoding framework produces better LOD sequences (i.e., having a lower agony) than the conventional encoding techniques. Further illustration of improved results is shown with regard to FIGS. 11A and 11B.

FIG. 11A is a diagram illustrating a table 1100 comparing values of agony from different approaches to compressing various models. The results of the encoding using above-described cost-driven progressive encoding framework is shown without and with texture cost for 10 different models, including Tiger. In all models shown in table 1100, the above-described cost-driven progressive encoding framework has a better agony than the other encoding techniques for all models, both with and without texture costs.

FIG. 11B is a diagram illustrating resulting textured meshes (A) and their atlases (B) resulting from the above-described cost-driven progressive encoding framework. 1102(A,B) is derived from the Bird model, 1104(A,B) is derived from the Salamander model, 1106(A,B) is derived from the Barabas model, 1108(A,B) is derived from the Taichi model, 1110(A,B) is derived from the Maasai Man model, 1112(A,B) is derived from the Maasai Woman model, 1114(A,B) is derived from the Tiger model, 1116(A, B) is derived from the Ajaccio model, 1118(A,B) is derived from the Aix model, 1120(A,B) is derived from the Dwarf model.

The discussion above concerned an improvement to conventional progressive encoding of LODs with and without texture images. Improvements to encoding of LODs representing surfaces of three-dimensional objects, however, does not require progressive encoding of the mesh that approximates the surface. Single-rate encoding of such meshes remains a possibility, as shown with regard to FIGS. 10A-11B.

Progressive compression is not the only way to provide a user with a refined depiction while the final high-resolution mesh is loading. With a few more bits one can already send a first approximation and then, let the user wait for the rest or send even a few more single rate encoded LODs before sending the highest LOD. In this regard the following is considered herein: (1) a single-rate alternative to the progressive approach and (2) an identification of a promising hybrid alternative that uses single rate encoding for the geometric part while using the same progressively encoded texture image via a previous re-atlased step. The alternative based on single-rate encoding first generates a series of LODs, then selects the best subset in terms of agony and single-rate encodes them.

Geometry.

In some implementations, geometry is generated by decimating the re-atlased input mesh using QEM5D as error metric. Decimation is made "toward abstraction" while preserving the virtual seams of the re-atlased texture. Compared to the progressive approach there is no constraint by independent sets. Hence a dynamic priority queue is used that produces LODs with higher quality. LODs are generated with the same mesh complexity as the above-described progressive geometric LODs and are compressed using DRACO with the same number of quantization bits as the progressive LODs. This sequence of geometry LODs was referred to as SG above.

Texture.

In some implementations, texture image LODs are generated by downsampling with bicubic interpolation. The total number of LODs matches the ones of our progressive LODs, and the number of pixels of each LOD is determined by linear interpolation between the number of pixels of the input texture, and the total number of pixels that correspond to the same single-rate JPEG bit-rate than the lowest LOD of the JPEG progressive texture. This sequence of texture data was referred to as ST above.

A technical problem with performing single-rate encoding operations on a sequence of mesh LODs is that the compression is not as efficient as that resulting from a progressive encoding operation of the mesh LODs. This is seen in FIG. 11A. The relative efficiency of progressive encoding is part of a tradeoff: upon decoding, it is faster to specify a single-rate encoded LOD for decoding and rendering than to decode and render several progressive-encoded LODs up to a specified LOD.

In this context, a mesh LOD can include a mesh approximating a surface at a certain level of detail and a texture atlas as defined previously. A texture atlas, defined above, can be an assignment of each corner of each triangle of a mesh to a pair of coordinates in a plane. A texture image LOD can be a three-dimensional representation of the texture mapped to the mesh and defined by the texture atlas of the mesh LOD. That is, there is a correspondence between the texture atlas of a mesh LOD and a texture image LOD that may be mapped onto the mesh. Two texture atlases can be compatible if a union of two-dimensional triangles of each of the atlases covers the same region in a texture image.

A technical solution to the above-described technical problem involves sharing a texture image LOD among different mesh LODs for single-rate encoding. That is, a first texture image LOD corresponding to a first mesh LOD may be derived by refining a second texture image LOD corresponding to a second mesh LOD. This sharing is possible when texture atlases of LOD meshes are compatible.

A technical advantage of the above-described technical solution is that an arrangement of single-rate encoded mesh LODs may be combined with an arrangement of encoded texture image LODs to produce a sequence of encoded LODs having an improved compression efficiency. Further, an even more efficiently compressed sequence of LODs may be determined by optimizing a cost metric function (e.g., the agony defined above) over candidate sequences of LODs. This was seen in the schemes OPT(SG), OPT(SGT), and OPT(SG)+PT shown above with regard to FIGS. 10A-11A.

Figure 12:
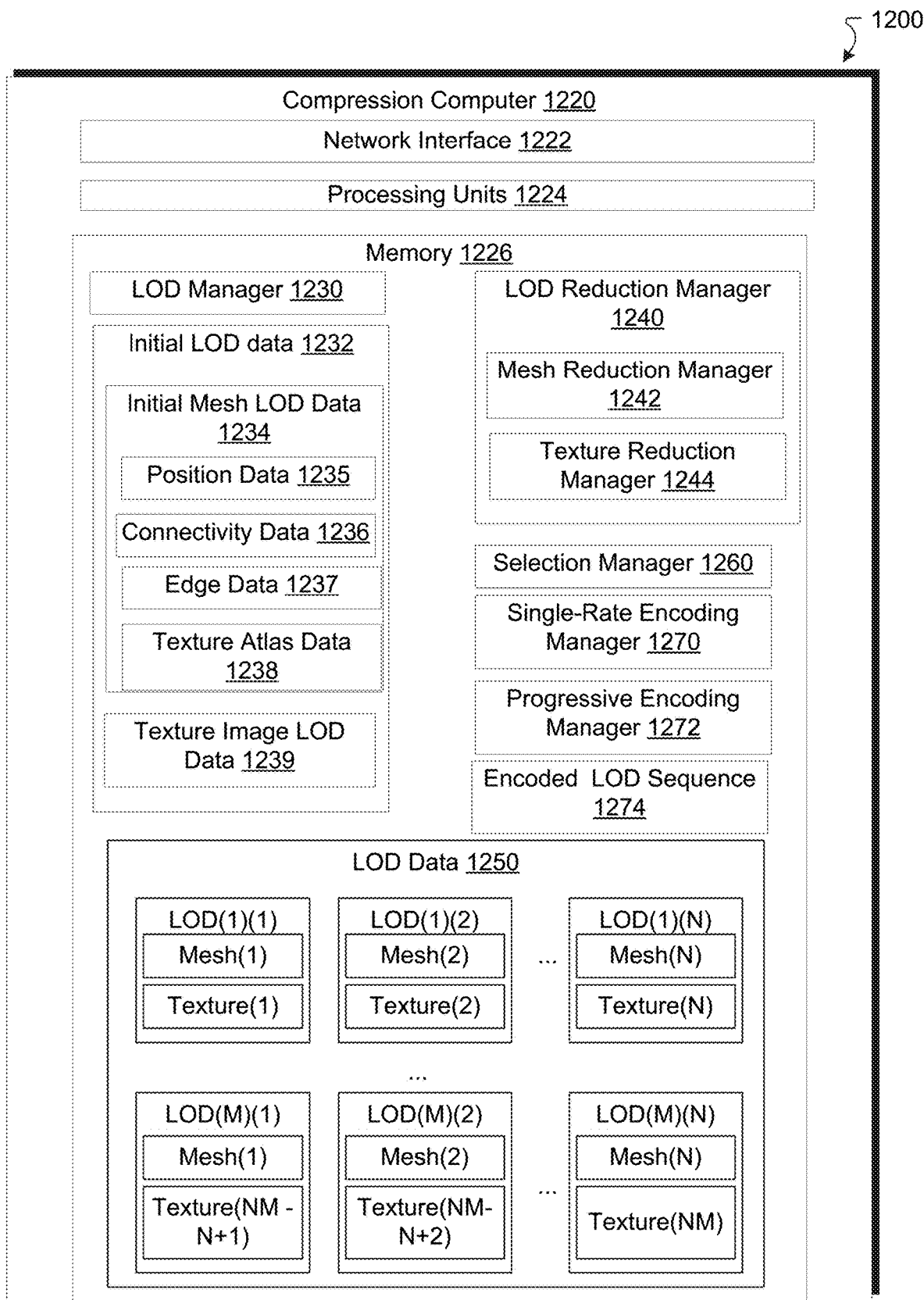
FIG. 12 is a diagram that illustrates another example electronic environment for implementing improved techniques described herein.

FIG. 12 is a diagram that illustrates an example electronic environment 1200 for implementing the above-described technical solution. As shown, in FIG. 12, the example electronic environment 1200 includes a compression computer 1220.

The compression computer 1220 is configured to compress data associated with a triangular mesh representing a three-dimensional object. The compression computer 1220 includes a network interface 1222, one or more processing units 1224, and memory 1226. The network interface 1222 includes, for example, Ethernet adaptors, Token Ring adaptors, and the like, for converting electronic and/or optical signals received from a network to electronic form for use by the point cloud compression computer 1220. The set of processing units 1224 include one or more processing chips and/or assemblies. The memory 1226 includes both volatile memory (e.g., RAM) and non-volatile memory, such as one or more ROMs, disk drives, solid state drives, and the like. The set of processing units 1224 and the memory 1226 together form control circuitry, which is configured and arranged to carry out various methods and functions as described herein.

In some embodiments, one or more of the components of the compression computer 1220 can be, or can include processors (e.g., processing units 1224) configured to process instructions stored in the memory 1226. Examples of such instructions as depicted in FIG. 12 include a LOD manager 1230, a LOD reduction manager 1240, a selection manager 1260, a single-rate encoding manager 1270, and a progressive encoding manager 1272. Further, as illustrated in FIG. 1, the memory 1226 is configured to store various data, which is described with respect to the respective managers that use such data.

The LOD manager 130 is configured to obtain, store, and/or transmit initial LOD data 1232. In some implementations, the LOD manager 130 is configured to receive the initial LOD data 1232 over a network connection via the network interface 122. In some implementations, the LOD manager 130 is configured to produce the initial LOD data 1232. In some implementations, the mesh manager 130 is configured to retrieve the initial LOD data 1232 from a storage medium (e.g., a disk, a flash drive, or the like).

The initial LOD data 1232 represents a LOD that is input into the LOD reduction manager 140. The LOD itself represents an approximation to a surface of a three-dimensional object. Such an approximation includes a geometric aspect (e.g., mesh connectivity, vertex coordinates), a texture aspect (texture atlas and coordinates), and an attribute aspect (e.g., normal, color). As shown in FIG. 1, the initial LOD data 1232 includes initial LOD mesh data 1234 and texture image LOD data 1239.

The initial LOD mesh data 1234 represents a triangular mesh and a texture atlas. The mesh includes vertices, edges connecting the vertices, and triangular faces defined by the edges. As shown in FIG. 1, the initial LOD mesh data 1234 includes position data 1235, connectivity data 1236, edge data 1237, and texture atlas data 1238.

The position data 1235 represents the positions of the vertices of the mesh. The positions of the vertices are representations of triplets of real numbers, each triplet being position coordinates of a vertex in space. In some implementations, the position coordinates are quantized so that the real numbers have truncated bit representations. In such an implementation, the vertices are adjusted to lie on a lattice, in which the lattice spacing decreases with the number of bits in the bit representation.

The connectivity data 1236 represents the topology and adjacency of the mesh. For example, the connectivity data 1236 is used to define a traversal of the mesh. In some implementations, the connectivity data 1236 includes triplets of integer indices for each corner of each triangular face of the mesh, each of the triplets including an index identifier of an associated vertex, an index identifier of an opposite corner, and an index identifier of an adjacent corner. The triplets are arranged in an order for traversal of the mesh. Such triplets then provide an ordering of the triangular faces for traversal and an orientation of each triangular face. The positions of the vertices represented by the position data 1235 are arranged in an order defined by the index identifiers included in the connectivity data 1236. In some implementations, the connectivity data 1236 takes the form of a doubly connected edge list, in which an opposing corner is interpreted as a half-edge.

The edge data 1237 represents the edges of the mesh as defined by the vertex position data 1235. In some implementations, the edges of the mesh are indexed based on the order of the triplets defined by the vertex position data 1235. In some implementations, a portion of the edge data 1237 represents seam edges.

The texture atlas data 1238 represents a texture that may be mapped onto the mesh represented by the initial LOD mesh data 1234. In some implementations, the texture atlas data 1238 includes coordinate pairs within a square or rectangular boundary of a texture atlas. In some implementations, there is more than one texture atlas represented by the texture atlas data 1238. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture atlas data 1238 further represents patches of image data such that the data of a patch is mapped to a subset of the triangular faces of the mesh. In some implementations, the texture data 138 also includes seams of the texture atlas, or boundaries of each of the patches. The seams form a subset of the edges represented by the edge data 1237.

The LOD reduction manager 1240 is configured to perform one of a plurality of LOD reduction processes on the initial LOD data 1232 to produce a sequence of mesh LODs from which LOD data 1250 is generated. The LOD reduction manager 1240 may, as shown in FIG. 1 with respect to mesh reduction manager 140, reduce using a mesh decimation operation, a XYZ quantization operation, and/or a UV quantization operation. In some implementations, the LOD reduction manager 1240 is also configured to generate a recovery bitstream representing the LOD reduction process that had been performed to produce a sequence of LODs.

The LOD data 1250, as mentioned above, is generated from a sequence of mesh LODs (i.e., Mesh(1), Mesh(2), . . . , Mesh(N)). For each mesh LOD of the sequence, a set of texture LODs are combined with that mesh LOD to form a respective column as shown in FIG. 12. As shown in FIG. 12, there are N mesh LODs and M texture image LODs. In some arrangements, the LOD data 1250 is not in the form of a rectangular array as shown in FIG. 12, but instead the number of texture images varies with the mesh LOD of the sequence.

The selection manager 1260 is configured to select a sequence of LODs from the LOD data 1250 for compression. In some implementations, the selection manager forms a set of candidate sequences of LODs from the LOD data 1250. The selection manager 1260 is then configured to select the sequence of LODs from the candidate sequence based on an optimization of a cost function. In some implementations, the cost function is the agony as defined previously.

The single-rate encoding manager 1270 is configured to perform a sequence of single-rate encoding operations on the mesh LODs of the LODs of the selected sequence of LODs to produce a sequence of single-rate encoded mesh LODs. The progressive encoding manager 1272 is configured to perform a progressive encoding operation on the texture image LODs corresponding to the mesh LODs of the selected sequence of LODs to produce progressive-encoded texture image LODs. In some implementations, the texture image LODs are single-rate encoded. The single-rate encoding manager 1270 and/or the progressive rate encoding manager 1272 are/is further configured to combine or merge the sequence of single-rate encoded mesh LODs and then progressive-encoded texture image LODs to produce an encoded LOD sequence 1274. This encoded LOD sequence 1274 may then be transmitted to a client computer for decoding and rendering of the LODs on a display.

Figure 13:
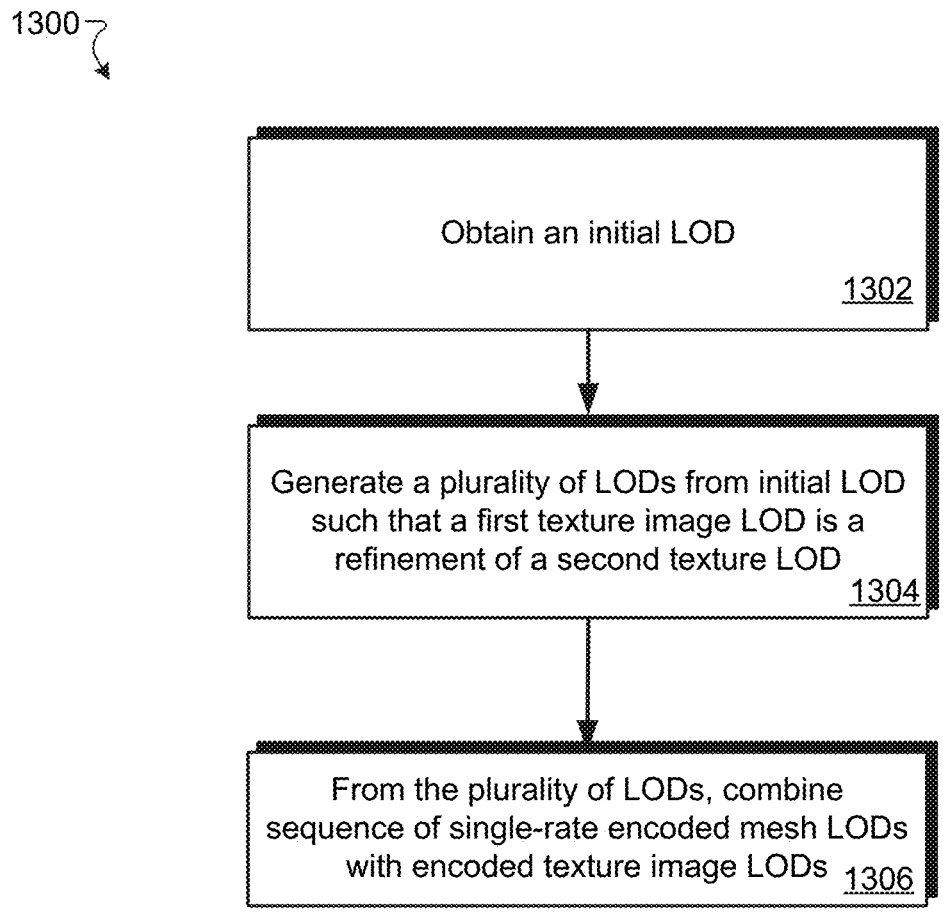
FIG. 13 is a diagram that illustrates an example method of performing the improved techniques within the electronic environment shown in FIG. 12.

FIG. 13 is a flow chart depicting an example method 1300 of encoding LOD data. The method 1300 may be performed by software constructs described in connection with FIG. 12, which reside in memory 1226 of the user device computer 1220 and are run by the set of processing units 1224.

At 1302, the LOD manager 1230 obtains data (e.g., initial LOD data 1232) representing an initial level of detail (LOD), the initial LOD including an initial mesh LOD (e.g., initial mesh LOD data 1234) and an initial texture image LOD (texture image LOD data 1239), the initial mesh LOD including an initial triangular mesh (e.g., position data 1235, connectivity data 1236, edge data 1237) and an initial texture atlas (texture atlas data 1238).

At 1304, the LOD reduction manager 1240 generates a plurality of LODs (e.g., LOD data 1250) based on the initial LOD, each of the LODs of the plurality including a respective mesh LOD and a respective texture image LOD, a first texture image LOD of a first LOD of the plurality being a refinement of a second texture image LOD of a second LOD of the plurality.

At 1306, the single-rate encoding manager 1270 performs single-rate encoding operations on the respective mesh LODs of a sequence of LODs (e.g., selected by the selection manager 1260) of the plurality to produce a sequence of single-rate encoded mesh LODs, the single-rate encoded mesh LODs, when combined with an encoding of corresponding texture image LODs, forming an efficient compression of the data (e.g., encoded LOD sequence 1274) that, upon decoding, enables a user to render the surface at any LOD.

Figure 14:
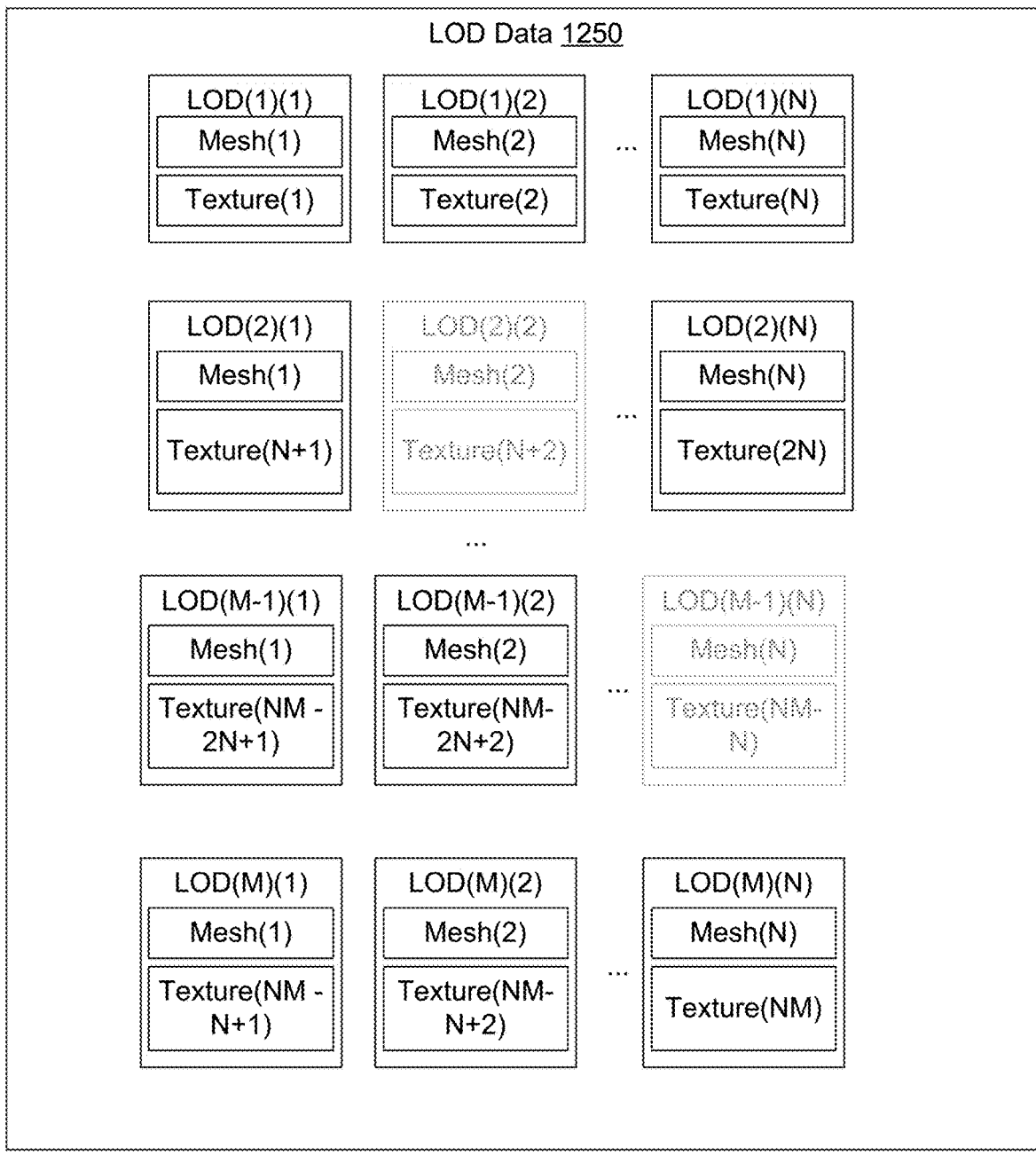
FIG. 14 is a diagram that illustrates an example arrangement of LOD data and the removal of some of the data.

FIG. 14 is a diagram that illustrates an example arrangement of the LOD data 1250. In this arrangement, the LOD data 1250 are arranged in a rectangular array as shown in FIG. 12. The intention here, however, is to demonstrate how the LOD data 1250 provides the sequence of encoded LODs 1274 as shown in FIG. 12.

In some implementations, generating the plurality of LODs includes specifying the initial texture atlas 1238 such that subsequent texture atlases produced after mesh reduction operations are compatible with the initial texture atlas 1238. In some implementations, generating the plurality of LODs includes generating an abstraction of the initial mesh LOD, the abstraction including a set of edges that form a one-to-one correspondence with a set of seam edges of the initial mesh LOD. In some implementations, the abstraction is specified. In some implementations, generating the abstraction includes performing a mesh decimation operation on the initial mesh LOD.

In some implementations, generating the abstraction includes performing an optimal Delaunay triangulation operation on the initial mesh LOD. An optimal Delaunay triangulation is, in some implementations, a Delaunay triangulation that minimizes an energy metric. In some implementations, a Delaunay triangulation is a Delaunay triangulation that minimizes a maximum angle of the mesh.

In some implementations, generating the abstraction includes performing a variational shape approximation on the initial mesh LOD. A variational shape approximation involves partitioning the initial mesh LOD and parametrizing each partition such that the resulting reduced mesh minimizes an energy metric.

The selection manager 1260 is configured to select a sequence of mesh LODs for single-rate encoding. In some implementations, the selection manager 1260 produces candidate sequences of mesh LODs from which the selection manager 1260 selects the sequence. In some implementations, the selection manager 1260 selects the sequence of mesh LODs from the candidate sequences by generating a cost function value for each of the candidate sequences and selecting, as the sequence, the candidate sequence for which the cost function value is an optimum, or minimum. In some implementations, the selection manager 1260 produces the candidate sequences of mesh LODs by finding, as a next member of a candidate sequence, a mesh LOD that has twice the number of vertices as the current member.

In some implementations, the selection manager performs the selection by generating a directed acyclic graph (DAG) that represents the plurality of LODs, each node of the DAG representing a LOD of the plurality of LODs. In some implementations, performing the LOD optimization operation on the plurality of LODs includes generating a cost for each edge of the DAG. In some implementations, the cost is the agony as defined above.

In some implementations, there is the same number L=M=N of geometry LODs and texture LODs, for example L may be 40. Instead of pairing the first geometry LOD from SG with the first texture LOD from ST and so on, the pairs (bit-rate; distortion) are computes for all possible LODs (i.e., $L^2$ pairs of mesh/texture LOD) and store them in an array. The $L^2$LODs are ordered by increasing order of distortion. In some implementations, the size of this array is reduced as follows. Let x and y be two different LODs, $D_x$ (resp. $D_y$) be the distortion of x (resp. y) and $R_x$ (resp. $R_y$) be the bit-rate of x (resp. y). If $D_x<D_y$ and $R_x<R_y$, then y is discarded. The array is now also sorted by decreasing order of bit-rate. This sequence of LODs is referred to as SGT. In these regards, qualities of single-rate LODs are better than the progressive LODs, since their geometry do not have to use the batched process via independent sets. In FIG. 14, those discarded LODs (LOD(2)(2) and LOD(M−1)(N)) are shown in light gray.

Figure 15A:
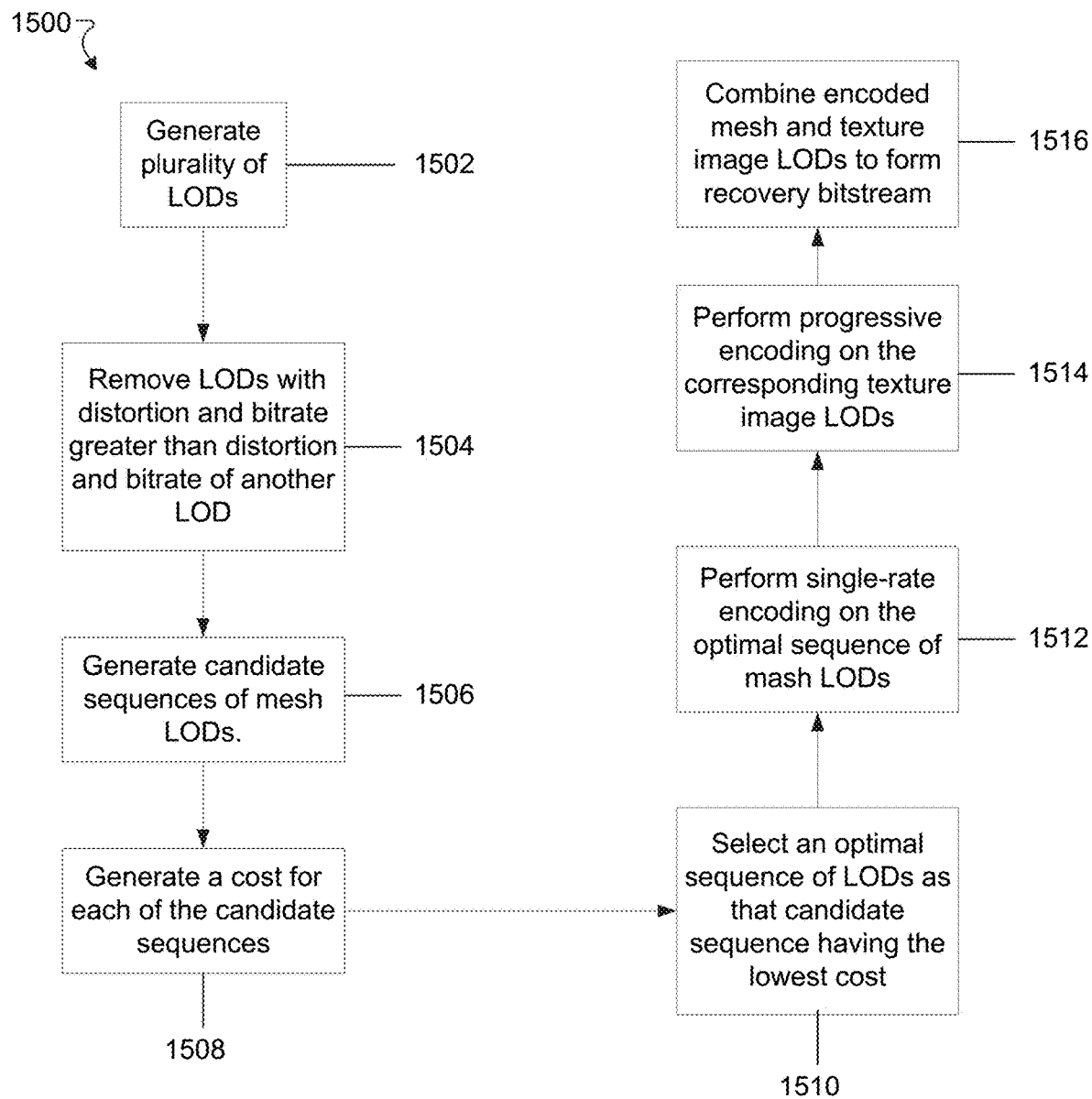
FIG. 15A is a diagram that illustrates a flow chart representing a process for generating a hybrid encoding of mesh and texture image LODs.

FIG. 15A is a diagram that illustrates a flow chart representing a process 1500 for generating a hybrid encoding of mesh and texture image LODs. The process 1500 may be performed by software constructs described in connection with FIG. 12, which reside in memory 1226 of the user device computer 1220 and are run by the set of processing units 1224.

At 1502, the LOD reduction manager 1240 generates a plurality of LODs (e.g., the LOD data 1250).

At 1504, the LOD selection manager 1260 removes or discards those LODs with a distortion and bitrate greater than a distortion and bitrate of another LOD of the plurality, as described with regard to FIG. 14.

At 1506, the LOD selection manager 1260 generates candidate sequences of mesh LODs as described with regard to FIG. 14.

At 1508, the LOD selection manager 1260 generates a cost function value for each of the candidate sequences. In some implementations, the cost function is the agony.

At 1510, the LOD selection manager 1510 seelects an optimal sequence of LODs (i.e., the sequence of LODs) as the candidate sequence having the lowest cost function value.

At 1512, the single-rate encoding manager 1270 performs a single-rate encoding operation on each of the mesh LODs of the selected sequence of LODs to produce a sequence of single-rate encoded mesh LODs.

At 1514, the progressive encoding manager 1272 performs a progressive encoding of the texture image LODs to produce progressive-encoded texture image LODs.

At 1516, the single-rate encoding manager 1270 combines the sequence of single-rate encoded mesh LODs and the progressive-encoded texture image LODs to form an encoded LOD sequence 1274.

Figure 15B:
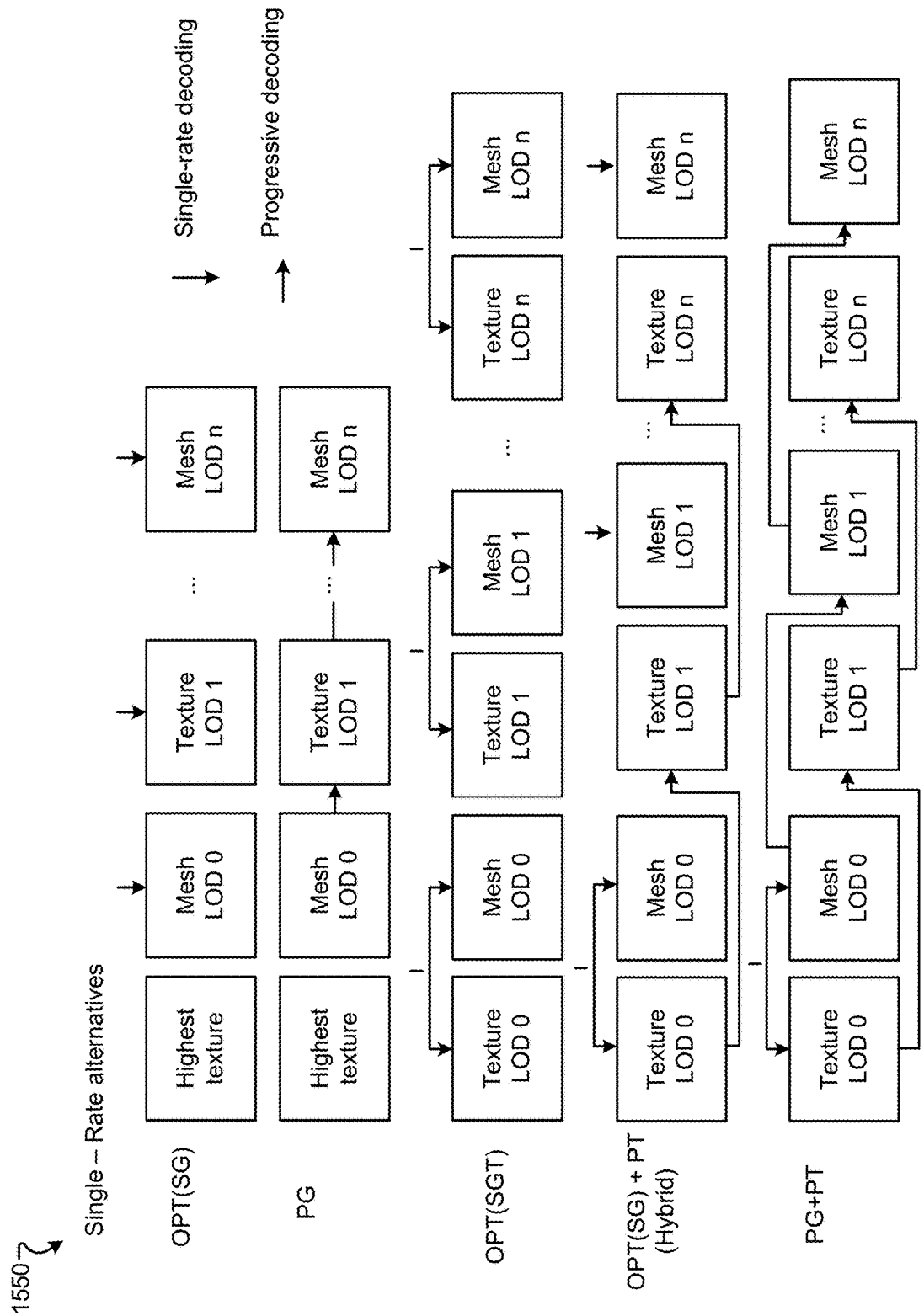
FIG. 15B is a diagram that illustrates example encoding schemes for mesh and texture image LODs.

FIG. 15B is a diagram that illustrates example encoding schemes 1550 for mesh and texture image LODs. The schemes 1550 include the hybrid approach described above, in which both the initial mesh LOD 1234 and the initial texture image LOD 1239 are single-rate encoded. Each subsequent, reduced mesh LOD is single-rate encoded, while each texture image LOD is progressive encoded.

Figure 16:
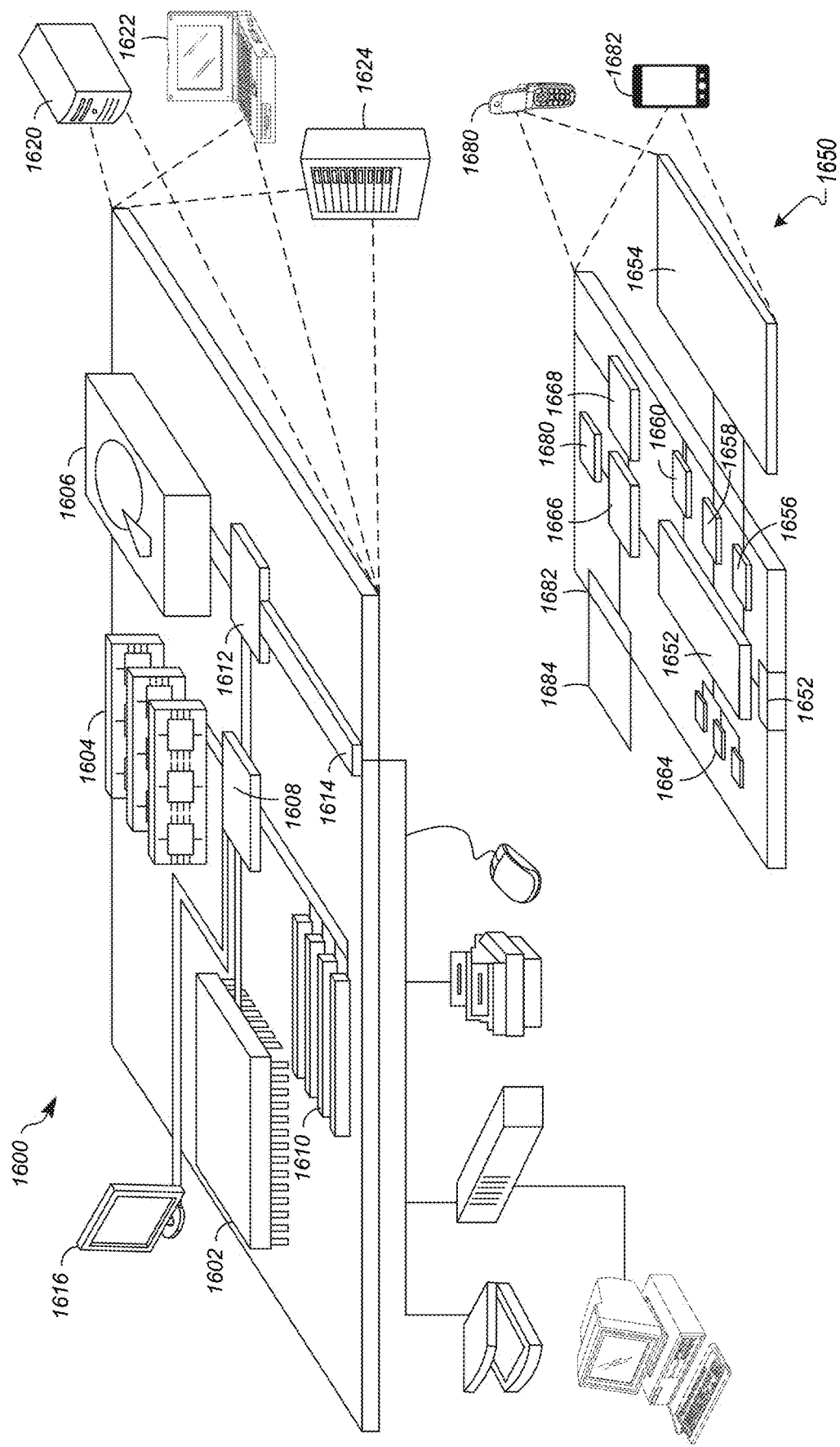
FIG. 16 illustrates an example of a computer device and a mobile computer device that can be used with circuits described here.

FIG. 16 illustrates an example of a generic computer device 1600 and a generic mobile computer device 1650, which may be used with the techniques described here.

As shown in FIG. 12, computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 254 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1274 may also be provided and connected to device 1650 through expansion interface 1272, which may include, for example, a SIMM (Single In Line Memory Module) card interface. Such expansion memory 1274 may provide extra storage space for device 1650, or may also store applications or other information for device 1650. Specifically, expansion memory 1274 may include instructions to carry out or supplement the processes described above, and may include secure information also. Thus, for example, expansion memory 1274 may be provided as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1274, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1270 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the compression computer 120 can be, or can include, any type of hardware and/or software configured to process attributes. In some implementations, one or more portions of the components shown in the components of the compression computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the compression computer 120 can be, or can include, a software module configured for execution by at least one processor (not shown). In some implementations, the functionality of the components can be included in different modules and/or different components than those shown in FIG. 1.

Although not shown, in some implementations, the components of the compression computer 120 (or portions thereof) can be configured to operate within, for example, a data center (e.g., a cloud computing environment), a computer system, one or more server/host devices, and/or so forth. In some implementations, the components of the compression computer 120 (or portions thereof) can be configured to operate within a network. Thus, the components of the compression computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 120 can be, or can include, processors configured to process instructions stored in a memory. For example, the LOD manager 130 (and/or a portion thereof), the LOD reduction manager 140 (and/or a portion thereof), the cost metric manager 160 (and/or a portion thereof), and the selection manager 170 (and/or a portion thereof) can be a combination of a processor and a memory configured to execute instructions related to a process to implement one or more functions.

Returning to FIG. 12, in some implementations, the memory 1226 can be any type of memory such as a random-access memory, a disk drive memory, flash memory, and/or so forth. In some implementations, the memory 1226 can be implemented as more than one memory component (e.g., more than one RAM component or disk drive memory) associated with the components of the compression computer 1220. In some implementations, the memory 1226 can be a database memory. In some implementations, the memory 1226 can be, or can include, a non-local memory. For example, the memory 1226 can be, or can include, a memory shared by multiple devices (not shown). In some implementations, the memory 126 can be associated with a server device (not shown) within a network and configured to serve the components of the compression computer 1220.

The components (e.g., modules, processing units 1224) of the compression computer 1220 can be configured to operate based on one or more platforms (e.g., one or more similar or different platforms) that can include one or more types of hardware, software, firmware, operating systems, runtime libraries, and/or so forth. In some implementations, the components of the compression computer 1220 can be configured to operate within a cluster of devices (e.g., a server farm). In such an implementation, the functionality and processing of the components of the compression computer 1220 can be distributed to several devices of the cluster of devices.

The components of the compression computer 1220 can be, or can include, any type of hardware and/or software configured to process attributes. In some implementations, one or more portions of the components shown in the components of the compression computer 1220 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the compression computer 1220 can be, or can include, a software module configured for execution by at least one processor (not shown). In some implementations, the functionality of the components can be included in different modules and/or different components than those shown in FIG. 12.

Although not shown, in some implementations, the components of the compression computer 1220 (or portions thereof) can be configured to operate within, for example, a data center (e.g., a cloud computing environment), a computer system, one or more server/host devices, and/or so forth. In some implementations, the components of the compression computer 1220 (or portions thereof) can be configured to operate within a network. Thus, the components of the compression computer 1220 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 120 can be, or can include, processors configured to process instructions stored in a memory. For example, the LOD manager 130 (and/or a portion thereof), the LOD reduction manager 140 (and/or a portion thereof), the selection manager 160 (and/or a portion thereof), the single-rate encoding manager 1270 (and/or a portion thereof), and the progressive encoding manager 1272 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

For example, in some implementations, the method further comprises performing a texture encoding operation on the respective texture image LODs of the sequence of LODs to produce encoded texture image LODs; and combining the encoded texture image LODs with the single-rate encoded mesh LODs to produce a hybrid-encoded recovery bitstream.

In some implementations, the texture encoding operation is a progressive encoding operation, and the encoded texture image LODs are progressive-encoded texture image LODs.

In some implementations, the method further comprises transmitting the hybrid-encoded recovery bitstream to a client computer, the client computer being configured to perform a decompress operation on the hybrid-encoded recovery bitstream to render the surface on a display connected to the client computer at a specified LOD.

In some implementations, the first LOD includes a first mesh LOD, and the second LOD includes a second mesh LOD, the first mesh LOD including a first texture atlas, the second mesh LOD including a second texture atlas. In such implementations, generating the plurality of LODs includes specifying the initial texture atlas such that the first texture atlas and the second texture atlas are compatible with the initial texture atlas.

In some implementations, the first LOD includes a first mesh LOD, and the second LOD includes a second mesh LOD, the first mesh LOD including a first texture atlas, the second mesh LOD including a second texture atlas. In such implementations, generating the plurality of LODs includes generating an abstraction of the initial mesh LOD, the abstraction including a set of edges that form a one-to-one correspondence with a set of seam edges of the initial mesh LOD.

In some implementations, generating the abstraction includes specifying the abstraction.

In some implementations, generating the abstraction includes performing a mesh decimation operation on the initial mesh LOD.

In some implementations, performing the mesh decimation operations includes performing a full-edge collapse operation on the initial mesh LOD.

In some implementations, generating the abstraction includes performing an optimal Delaunay triangulation operation on the initial mesh LOD.

In some implementations, generating the abstraction includes performing a variational shape approximation on the initial mesh LOD.

In some implementations, performing the mesh decimation operation includes performing a full-edge collapse operation.

In some implementations, the method further comprises performing a LOD selection operation to produce the sequence of LODs, the selection operation including optimizing a cost function of candidate sequences of mesh LODs.

In some implementations, performing the LOD selection operation further includes, for each of a candidate sequence of the specified number of LODs, generating, as the cost function, a sum of costs per LOD improvement, where the cost of an LOD improvement is based on a product of an amount of bits used and a distortion of an improved LOD.

In some implementations, performing the LOD selection operation further includes, for a first element of the plurality of LODs, removing the first element of the plurality of LODs in response to a distortion of the LOD of the first element being less than a distortion of the LOD of a second element and a bitrate of the LOD of the first element being less than the bitrate of the LOD of the second element.

In some implementations, selecting the sequence of LODs includes generating a directed acyclic graph (DAG) that represents the plurality of LODs, each node of the DAG representing a LOD of the plurality of LODs.

In some implementations, performing the LOD optimization operation on the plurality of LODs includes generating a cost for each edge of the DAG.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:

obtaining, by processing circuitry of a server computer configured to encode information related to a surface of a three-dimensional object, data representing an initial level of detail (LOD), the initial LOD including an initial mesh LOD and an initial texture image LOD, the initial mesh LOD including an initial triangular mesh and an initial texture atlas;

generating, by the processing circuitry, a plurality of LODs based on the initial LOD, each of the LODs of the plurality of LODs including a respective mesh LOD and a respective texture image LOD, a first texture image LOD of a first LOD of the plurality of LODs being a refinement of a second texture image LOD of a second LOD of the plurality of LODs; and performing, by the processing circuitry, single-rate encoding operations on the respective mesh LODs of a sequence of LODs of the plurality of LODs to produce a sequence of single-rate encoded mesh LODs, the single-rate encoded mesh LODs, when combined with an encoding of corresponding texture image LODs, forming an efficient compression of the data that, upon decoding, enables a client computer to render the surface at a plurality of LODs.

2. The method as in claim 1, further comprising:

performing a texture encoding operation on the respective texture image LODs of the sequence of LODs to produce encoded texture image LODs; and combining the encoded texture image LODs with the single-rate encoded mesh LODs to produce a hybrid-encoded recovery bitstream.

3. The method as in claim 2, wherein the texture encoding operation is a progressive encoding operation, and the encoded texture image LODs are progressive-encoded texture image LODs.

4. The method as in claim 2, further comprising transmitting the hybrid-encoded recovery bitstream to the client computer, the client computer being configured to perform a decompress operation on the hybrid-encoded recovery bitstream to render the surface on a display connected to the client computer at a specified LOD.

5. The method as in claim 1, wherein the first LOD includes a first mesh LOD, and the second LOD includes a second mesh LOD, the first mesh LOD including a first texture atlas, the second mesh LOD including a second texture atlas, and wherein generating the plurality of LODs includes specifying the initial texture atlas such that the first texture atlas and the second texture atlas are compatible with the initial texture atlas.

6. The method as in claim 1, wherein the first LOD includes a first mesh LOD, and the second LOD includes a second mesh LOD, the first mesh LOD including a first texture atlas, the second mesh LOD including a second texture atlas, and wherein generating the plurality of LODs includes generating an abstraction of the initial mesh LOD, the abstraction including a set of edges that form a one-to-one correspondence with a set of seam edges of the initial mesh LOD.

7. The method as in claim 6, wherein generating the abstraction includes specifying the abstraction.

8. The method as in claim 6, wherein generating the abstraction includes performing a mesh decimation operation on the initial mesh LOD.

9. The method as in claim 8, wherein performing the mesh decimation operation includes performing a full-edge collapse operation on the initial mesh LOD.

10. The method as in claim 6, wherein generating the abstraction includes performing an optimal Delaunay triangulation operation on the initial mesh LOD.

11. The method as in claim 6, wherein generating the abstraction includes performing a variational shape approximation on the initial mesh LOD.

12. The method as in claim 1, wherein the method further comprises performing a LOD selection operation to produce the sequence of LODs, the LOD selection operation including optimizing a cost function of candidate sequences of mesh LODs.

13. The method as in claim 12, wherein performing the LOD selection operation further includes, for each of a candidate sequence of a specified number of LODs, generating, as the cost function, a sum of costs per LOD improvement, where the cost of an LOD improvement is based on a product of an amount of bits used and a distortion of an improved LOD.

14. The method as in claim 12, wherein performing the LOD selection operation further includes, for a first element of the plurality of LODs, removing the first element of the plurality of LODs in response to a distortion of the LOD of the first element being less than a distortion of the LOD of a second element and a bitrate of the LOD of the first element being less than the bitrate of the LOD of the second element.

15. The method as in claim 12, wherein selecting the sequence of LODs includes generating a directed acyclic graph (DAG) that represents the plurality of LODs, each node of the DAG representing a LOD of the plurality of LODs.

16. The method as in claim 15, wherein generating the DAG includes generating a cost for each edge of the DAG.

17. A computer program product comprising a nontransitory storage medium, the computer program product including code that, when executed by processing circuitry of a user device configured to encode information related to a surface of a three-dimensional object, causes the processing circuitry to perform a method, the method comprising:

obtaining data representing an initial level of detail (LOD), the initial LOD including an initial mesh LOD and an initial texture image LOD, the initial mesh LOD including an initial triangular mesh and an initial texture atlas;

generating a plurality of LODs based on the initial LOD, each of the LODs of the plurality of LODs including a respective mesh LOD and a respective texture image LOD, a first texture image LOD of a first LOD of the plurality of LODs being a refinement of a second texture image LOD of a second LOD of the plurality of LODs; and performing single-rate encoding operations on the respective mesh LODs of a sequence of LODs of the plurality of LODs to produce a sequence of single-rate encoded mesh LODs, the single-rate encoded mesh LODs, when combined with an encoding of corresponding texture image LODs, forming an efficient compression of the data that, upon decoding, enables a user client computer to render the surface at a plurality of LODs.

18. The computer program product as in claim 17, wherein the first LOD includes a first mesh LOD, and the second LOD includes a second mesh LOD, the first mesh LOD including a first texture atlas, the second mesh LOD including a second texture atlas, and wherein generating the plurality of LODs includes specifying the initial texture atlas such that the first texture atlas and the second texture atlas are compatible with the initial texture atlas.

19. An electronic apparatus configured to encode information related to a surface of a three-dimensional object, the electronic apparatus comprising:

memory; and controlling circuitry coupled to the memory, the controlling circuitry being configured to:

obtaining data representing an initial level of detail (LOD), the initial LOD including an initial mesh LOD and an initial texture image LOD, the initial mesh LOD including an initial triangular mesh and an initial texture atlas;

generating a plurality of LODs based on the initial LOD, each of the LODs of the plurality of LODs including a respective mesh LOD and a respective texture image LOD, a first texture image LOD of a first LOD of the plurality of LODs being a refinement of a second texture image LOD of a second LOD of the plurality of LODs; and performing single-rate encoding operations on the respective mesh LODs of a sequence of LODs of the plurality of LODs to produce a sequence of single-rate encoded mesh LODs, the single-rate encoded mesh LODs, when combined with an encoding of corresponding texture image LODs, forming an efficient compression of the data that, upon decoding, enables a client computer to render the surface at a plurality of LODs.

20. The electronic apparatus as in claim 19, wherein the controlling circuitry is further configured to perform a LOD selection operation to produce the sequence of LODs, the LOD selection operation including optimizing a cost function of candidate sequences of mesh LODs.

* * * * *